US006351700B1

United States Patent
Muramoto et al.

(10) Patent No.: US 6,351,700 B1
(45) Date of Patent: Feb. 26, 2002

(54) SPEED CHANGE CONTROLLER AND CONTROL METHOD OF INFINITE SPEED RATIO CONTINUOUSLY VARIABLE TRANSMISSION

(75) Inventors: Itsuro Muramoto; Taketoshi Kawabe; Shin-ichiro Joe; Yasushi Narita; Hiromasa Sakai; Motoharu Nishio, all of Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/605,757

(22) Filed: Jun. 28, 2000

(30) Foreign Application Priority Data

Jun. 28, 1999 (JP) .......................................... 11-181842
May 11, 2000 (JP) .......................................... 12-138161

(51) Int. Cl.$^7$ ................................................. G06F 7/00
(52) U.S. Cl. ............................. 701/51; 701/67; 477/39
(58) Field of Search ............................. 701/51, 55, 56, 701/67; 477/31, 37, 39

(56) References Cited

U.S. PATENT DOCUMENTS 5,288,281 A * 2/1994 Perry .......................... 475/191
5,564,998 A * 10/1996 Fellows ....................... 475/216
5,766,105 A * 6/1998 Fellows et al. ................ 474/18
5,885,185 A 3/1999 Kidokoro et al. .............. 476/10

FOREIGN PATENT DOCUMENTS

JP 9-89071 3/1997
JP 10-267116 10/1998

* cited by examiner

*Primary Examiner*—Yonel Beaulieu
(74) *Attorney, Agent, or Firm*—Foley & Lardner

(57) ABSTRACT

An infinite speed ratio continuously variable transmission is provided with a continuously variable transmission (2), fixed speed ratio transmission (3), planetary gear set (5), power recirculation clutch (9) and direct clutch (10). A target speed ratio of the infinite speed ratio continuously variable transmission is set based on a vehicle speed and an accelerator pedal depression amount. When the target speed ratio varies beyond a rotation synchronous point, a control unit (80) assigns an order of priority to control of the power recirculation clutch (9) and direct clutch (10), and control of the speed ratio of the continuously variable transmission (2), and thereby causes a real speed ratio of the infinite speed ratio continuously variable transmission to vary in the same direction until it reaches the target speed ratio (S21, S22, S31, S32, S121, S122).

11 Claims, 16 Drawing Sheets

SPEED CHANGE CONTROLLER AND CONTROL METHOD OF INFINITE SPEED RATIO CONTINUOUSLY VARIABLE TRANSMISSION

FIELD OF THE INVENTION

This invention relates to control of an infinite speed ratio continuously variable transmission for vehicles.

BACKGROUND OF THE INVENTION

Tokkai Hei10-267116 published by the Japanese Patent Office in 1998 discloses an infinite speed ratio continuously variable transmission for a vehicle (referred to hereafter as IVT) which can vary a speed ratio continuously to infinity by combining a reduction gear and a planetary gear set with a toroidal continuously variable transmission (referred to hereafter as CVT).

The rotation of an engine is input to the CVT whereof the speed ratio can be varied continuously, and a reduction gear having a fixed speed change ratio. The rotation of an output shaft of the CVT is input to a sun gear of the planetary gear set, and the rotation of an output shaft of the reduction gear is input to a planet carrier of the planetary gear set. The final output shaft of the IVT is joined to a ring gear of the planetary gear set. The output shaft of the reduction gear and planet carrier are joined via a power recirculation clutch. The output shaft of the CVT is also joined to the final output shaft via a direct clutch.

In a power recirculation mode wherein the power recirculation clutch is engaged and the direct clutch is disengaged, the direction and speed of output rotation of the final output shaft varies according to the difference of the speed ratio of the CVT, and the speed ratio of the reduction gear. Specifically, the speed ratio Ii of the IVT, i.e., the value of the input shaft rotation speed/final output shaft rotation speed of the IVT varies from a negative value to a positive value. Also, at the point where the rotation direction of the final output shaft varies, the speed ratio of the IVT Ii is infinite, and the final output shaft is stationary. This point is referred to as a geared neutral point (GNP).

On the other hand, in a direct mode wherein the power recirculation clutch is disengaged and the direct clutch is engaged, the rotation of the CVT output shaft is output to the final output shaft without modification, so the speed ratio Ii of the IVT is equal to the CVT speed ratio IC.

The change-over between the power recirculation mode and the direct mode is performed at a rotation synchronous point (RSP) at which the IVT speed ratio Ii of each mode coincide with each other. If we define the inverse of the IVT speed ratio Ii as an IVT speed ratio factor E, the IVT speed ratio factor E increases as the vehicle starts to move forward and accelerate in the power recirculation mode. The CVT speed ratio Ic also increases at that time. At the RSP, a mode change-over is performed, and in the subsequent direct mode, the IVT speed ratio factor E continues to increase but the CVT speed ratio IC decreases. Also, reversing of the vehicle is performed only in the power recirculation mode, wherein the IVT speed ratio factor E increases in negative value and the CVT speed ratio Ic approaches O together with the acceleration of the vehicle.

SUMMARY OF THE INVENTION

During a kickdown operation of the IVT, i.e., an increases of the speed ratio of the IVT due to the depression of an accelerator pedal of the vehicle by a driver, or during a shift-up operation of the IVT when the driver releases his foot from the accelerator pedal, a rapid speed change is required. If this speed change is performed beyond the rotation synchronous point RSP, the CVT speed ratio Ic is temporarily fixed at the rotation synchronous point RSP, and the engagement and disengagement of the power recirculation clutch and direct clutch are changed over. However, this change-over delays variation of the IVT speed ratio Ii.

One way of enabling rapid speed change would be to make the change-over between the power recirculation mode and direct mode while the clutches are partially engaged. However, the change-over of the operation mode of the IVT in the course of IVT speed ratio control towards a target value may cause the IVT speed ratio to overrun the target value. In this case, the shift direction of the IVT abruptly reverses immediately after the change-over of operation mode so as to cancel out the overrun, and the driver may experience an uncomfortable feeling due to the abrupt change of the shift direction of the IVT.

It is therefore an object of this invention to perform the change-over between the power recirculation mode and the direct mode of the IVT smoothly in a short time.

In order to achieve the above object, this invention provides a speed change controller for such an infinite speed ratio continuously variable transmission for use with a vehicle that comprises an input shaft, a continuously variable transmission which transmits a rotation speed of the input shaft to a continuously variable transmission output shaft at an arbitrary speed ratio, a fixed speed ratio transmission which transmits the rotation speed of the input shaft to a fixed speed ratio transmission output shaft at a fixed speed ratio, a planetary gear set comprising a first rotation member joined to the continuously variable transmission output shaft, a second rotation member joined to the fixed speed ratio transmission output shaft, and a third rotation member which varies a rotation direction and a rotation speed according to a difference between a rotation speed of the first rotation member and a rotation speed of the second rotation member, a direct clutch which connects and disconnects the continuously variable transmission output shaft and the third rotation member, and a power recirculation clutch which connects and disconnects the fixed speed ratio transmission output shaft and the second rotation member.

The speed change controller comprises a sensor which detects a running state of the vehicle, a sensor which detects a real speed ratio of the infinite speed ratio continuously variable transmission, and a microprocessor programmed to set a target speed ratio of the infinite speed ratio continuously variable transmission based on the running state, determine whether or not the target speed ratio has varied beyond a predetermined speed ratio, determine a priority of controlling the power recirculation clutch and direct clutch, and controlling the speed ratio of the continuously variable transmission, so that, when the target speed ratio has varied beyond the predetermined speed ratio, the real speed ratio of the infinite speed ratio continuously variable transmission varies in the same direction until it reaches the target speed ratio, and control the power recirculation clutch and direct clutch, and control the speed ratio of the continuously variable transmission, according to the priority.

This invention also provides a speed change controller comprising a mechanism for detecting a running state of the vehicle, a mechanism for detecting a real speed ratio of the infinite speed ratio continuously variable transmission, a mechanism for setting a target speed ratio of the infinite speed ratio continuously variable transmission based on the running state, a mechanism for determining whether or not the target speed ratio has varied beyond a predetermined speed ratio, a mechanism for determining a priority of controlling the power recirculation clutch and direct clutch, and controlling the speed ratio of the continuously variable transmission, so that, when the target speed ratio has varied beyond the predetermined speed ratio, the real speed ratio of the infinite speed ratio continuously variable transmission varies in the same direction until the real speed ratio reaches the target speed ratio, and a mechanism for performing control of the power recirculation clutch and direct clutch, and of the speed ratio of the continuously variable transmission, according to the priority.

This invention also provides a speed change control method for the infinite speed ratio continuously variable transmission for use with a vehicle. The method comprises detecting a running state of the vehicle, detecting a real speed ratio of the infinite speed ratio continuously variable transmission, setting a target speed ratio of the infinite speed ratio continuously variable transmission based on the running state, determining whether or not the target speed ratio has varied beyond a predetermined speed ratio, determining a priority of controlling the power recirculation clutch and direct clutch, and controlling the speed ratio of the continuously variable transmission, so that, when the target speed ratio has varied beyond the predetermined speed ratio, the real speed ratio of the infinite speed ratio continuously variable transmission varies in the same direction until the real speed ratio reaches the target speed ratio, and performing control of the power recirculation clutch and direct clutch, and of the speed ratio of the continuously variable transmission, according to the priority.

The details as well as other features and advantages of this invention are set forth in the remainder of the specification and are shown in the accompanying drawings.

DESCRIPTION OF THE PREFERRED EMBODIMENTS

Figure 1:
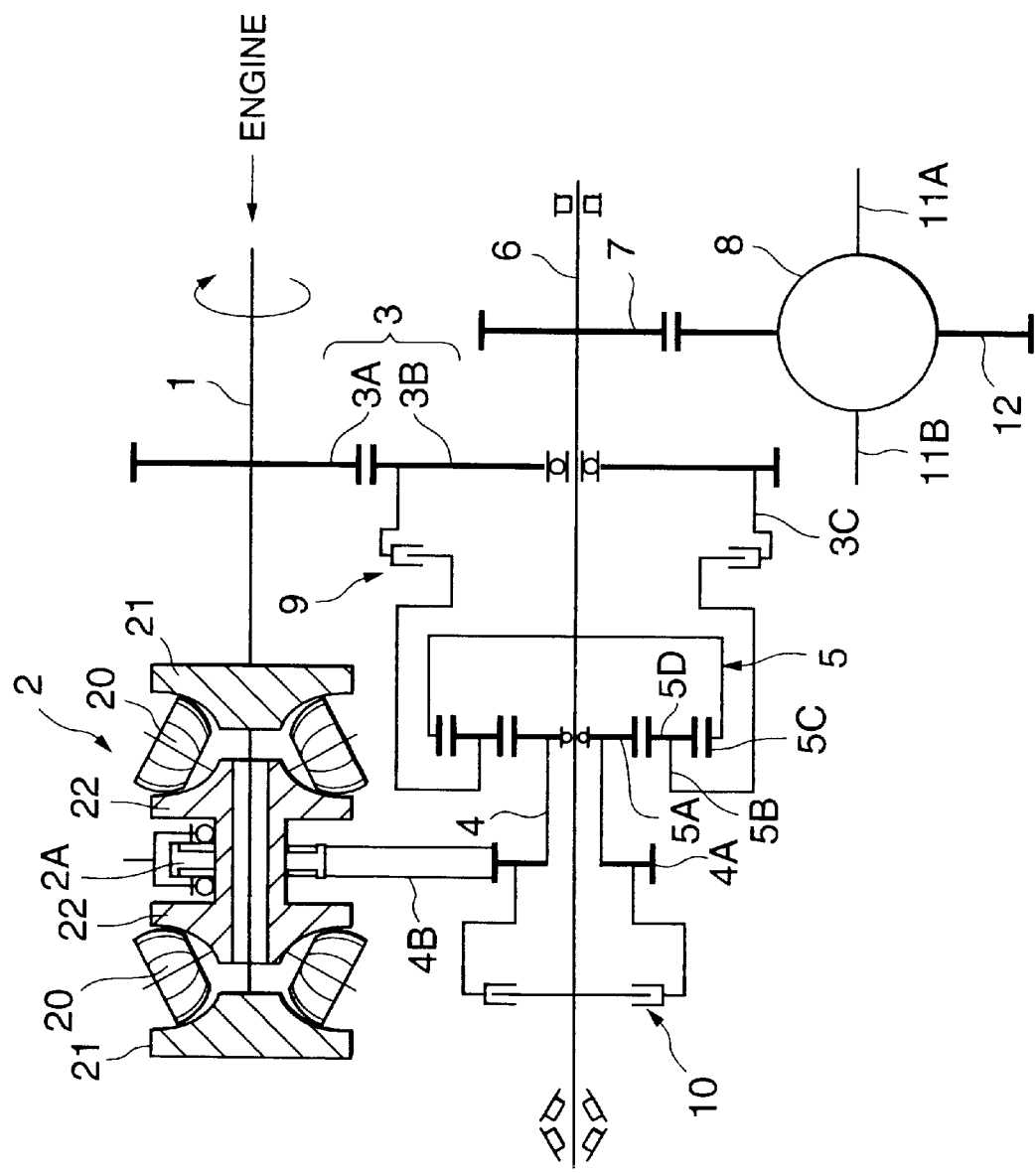
FIG. 1 is a schematic drawing of an infinite speed ratio continuously variable transmission (IVT) to which this invention is applied.

Referring to FIG. 1 of the drawings, an IVT for a vehicle comprises an input shaft 1, toroidal continuously variable transmission (CVT) 2, reduction gear 3, planetary gear set 5, final output shaft 6, power recirculation clutch 9 and direct clutch 10.

The CVT 2 comprises two sets of input disks 21 and output disks 22. A pair of power rollers 20 are gripped between the input disks 21 and output disks 22. The input disks 21 are joined to the input shaft 1. The input shaft 1 is joined to an output shaft of an engine, not shown. The rotation of the output disk 22 is transmitted to a CVT output shaft 4 via a sprocket 2A, chain 4B and sprocket 4A.

The CVT output shaft 4 is joined to a sun gear 5A of the planetary gear set 5, and is also joined to the final output shaft 6 via the direct clutch 10.

The reduction gear 3 comprises a gear 3A which is joined to the input shaft 1, a gear 3B and a gear output shaft 3C. The gear 3A engages with the gear 3B which is fixed to the gear output shaft 3C. The gear output shaft 3C is joined to a planet carrier 5B which carries plural planet gears 5D of the planetary gear set 5 via the power recirculation clutch 9. A ring gear 5C of the planetary gear set 5 is joined to the final output shaft 6.

The rotation of the final output shaft 6 is transmitted to drive wheels 11A, 11B of the vehicle via a transmission output gear 7, final gear 12 and differential gear 8.

In this IVT, the drive wheels 11A, 11B are driven by one of two power transmission modes, i.e., a power recirculation mode wherein the power recirculation clutch 9 is engaged and the direct clutch 10 is disengaged, and a direct mode wherein the power recirculation clutch 9 is disengaged and the direct clutch 10 is engaged.

In the power recirculation mode, the rotation speed of the planet carrier 5B is equal to a value obtained by dividing the rotation speed of the engine by the speed ratio of the reduction gear 3. The speed ratio of the reduction gear 3 is a fixed value. On the other hand, the rotation speed of the sun gear 5A is equal to a value obtained by dividing the rotation speed of the engine by the speed ratio Ic of the CVT 2. Also, the rotation directions of the gear 5A and planet carrier 5B are always fixed. Under these conditions, the rotation direction of the ring gear 5C joined to the final output shaft 6 varies according to the ratio of the rotation speed of the planet carrier 5B and the rotation speed of the sun gear 5C. In other words, the rotation direction of the ring gear 5C varies according to a ratio of an engine rotation speed Ne and the rotation speed of the CVT output shaft 4, which is proportional to the CVT speed ratio Ic. This variation point is referred to as the geared neutral point GNP shown in FIG. 8.

At the geared neutral point GNP, the ring gear 5C, i.e., the final output shaft 6, does not rotate, and the vehicle is at rest. When the CVT speed ratio Ic increases beyond the geared neutral point GNP, the ring gear 5C rotates in a forward direction, and when the CVT speed ratio Ic decreases to less than the GNP, the ring gear 5C rotates in a reverse direction. In other words, in the power recirculation mode, forward motion and reverse motion of the vehicle can be changed over by controlling the CVT speed ratio Ic.

Figure 8:
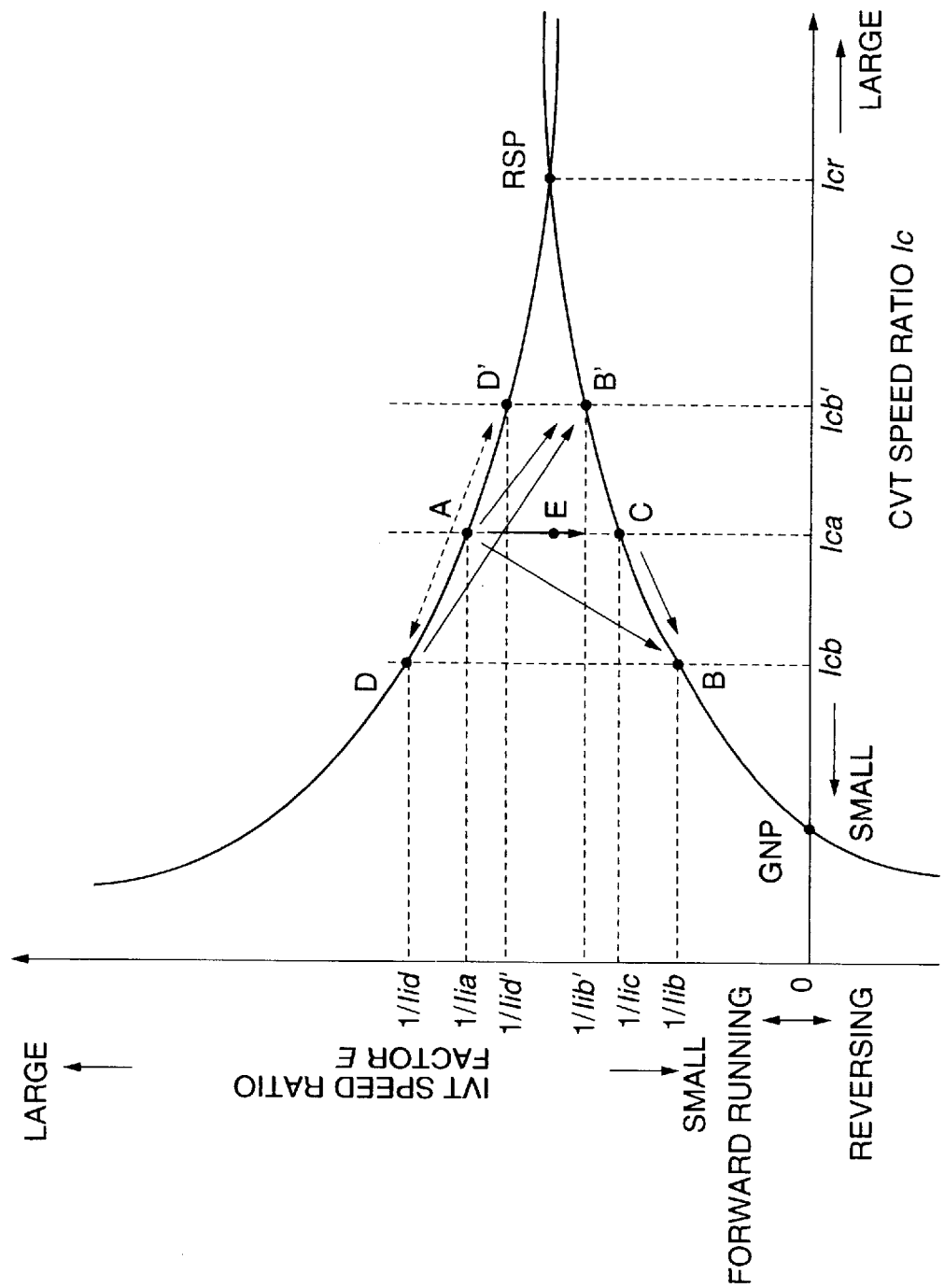
FIG. 8 is a diagram showing a relation between an IVT speed ratio factor E and a CVT speed ratio Ic in the IVT.

When the vehicle is moving forward in the power recirculation mode, the IVT speed ratio Ii decreases as the CVT speed ratio Ic increases. In other words, the IVT speed ratio factor $E=1/i$ increases as shown in FIG. 8.

When the IVT speed ratio factor E reaches the rotation synchronous point RSP, there is a shift from the power recirculation mode to the direct mode of the IVT. In the direct mode, the rotation of the CVT output shaft 4 is output to the final output shaft 6 directly, so the IVT speed ratio factor E increases as the CVT speed ratio Ic decreases. When the vehicle decelerates during travel, the CVT speed ratio Ic varies in an opposite direction to its variation during acceleration. This characteristic of the IVT of is disclosed in Tokkai Hei 9-89071 published by the Japanese Patent Office in 1997.

Figure 2:
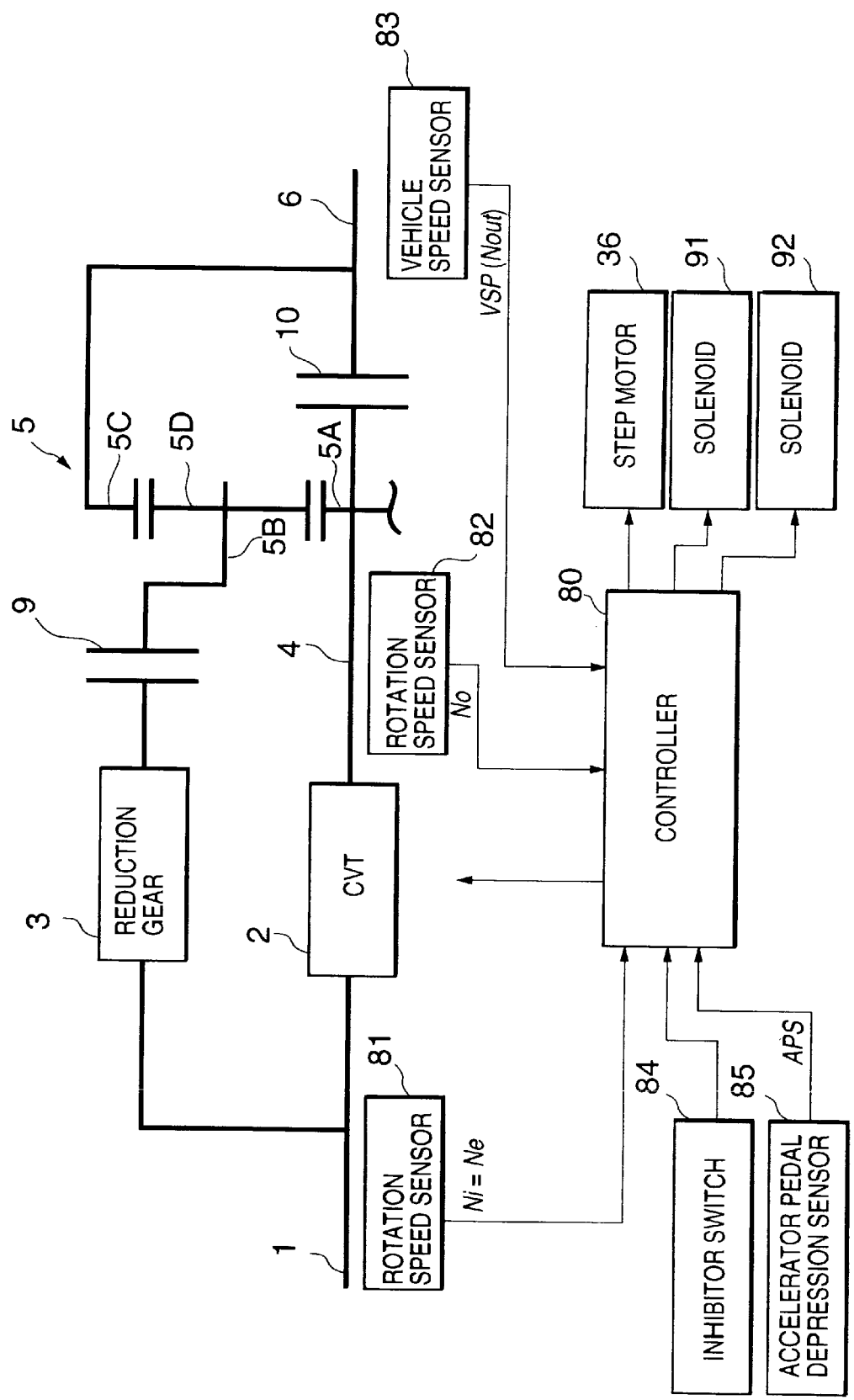
FIG. 2 is a schematic drawing of a speed change controller according to this invention.

The CVT speed ratio Ic varies according to the variation of the gyration angle of the power rollers 20. To vary the gyration angle of the power rollers 20, the speed change controller according to this invention comprises a step motor 36 shown in FIG. 2. The step motor 36 varies the gyration angle of the power rollers 20 by driving trunnions, not shown, which support the power rollers 20 based on a step signal input from a control unit 80. The control of the gyration angle of the power rollers of the CVT using a step motor is known by U.S. Pat. No. 5,885,185.

The control of the IVT speed ratio Ii comprises a control of the CVT speed ratio Ic, and the engaging and disengaging operation of the power recirculation clutch 9 and direct clutch 10. These controls are performed by the control unit 80 shown in FIG. 2. The control unit 80 comprises a central processing unit (CPU), read-only memory (ROM), random access memory (RAM) and input/output interface (I/O interface).

Signals showing detection values are input to the control unit 80 respectively from a rotation speed sensor 81 which detects a rotation speed Ni of the input shaft 1, rotation speed sensor 82 which detects the rotation speed No of the CVT output shaft 4, vehicle speed sensor 83 which detects a vehicle speed VSP from a rotation speed Nout of the final output shaft 6, inhibitor switch 85 which detects a selection position of a selector lever with which the vehicle is provided, and an accelerator pedal depression amount sensor 84 which detects an accelerator pedal depression amount APS of the vehicle. The input shaft rotation speed Ni is equal to the engine rotation speed Ne, therefore a crank angle sensor which detects the engine rotation speed Ne may be used instead of the rotation speed sensor 81. The vehicle speed VSP is obtained by multiplying the rotation speed Nout of the final output shaft 6 by a predetermined constant.

The control unit 80 determines a target IVT speed ratio TIiO based on these input signals, and controls the CVT speed ratio Ic to be equal to the target IVT speed ratio TIiO by a signal output to the step motor 36. The power recirculation clutch 9 and direct clutch 10 are selectively engaged via solenoids 91, 92 so as to change over between the power recirculation mode and direct mode.

The control of the power recirculation clutch 9 comprises the continuous variation of an engaging force by duty controlling the solenoid 91 so as to produce a partially engaged state. Likewise, the control of the direct clutch 10 comprises continuous variation of an engaging force by duty controlling the solenoid 92 so as to produce a partially engaged state.

Next, a main routine and subroutines to implement the above speed change control performed by the control unit 80 will be described in detail referring to FIGS. 3A, 3B, 4 and 5. The main routine and all the subroutines are executed at an interval of ten milliseconds. All the flags used in the flowcharts take a value of 0 or 1. The initial value of these flags is 0. The terms shift-up and shift-down used in the flowcharts relate to variation of the speed ratio Ic of the CVT 2, and not to the speed ratio Ii of the IVT.

Figure 3A:
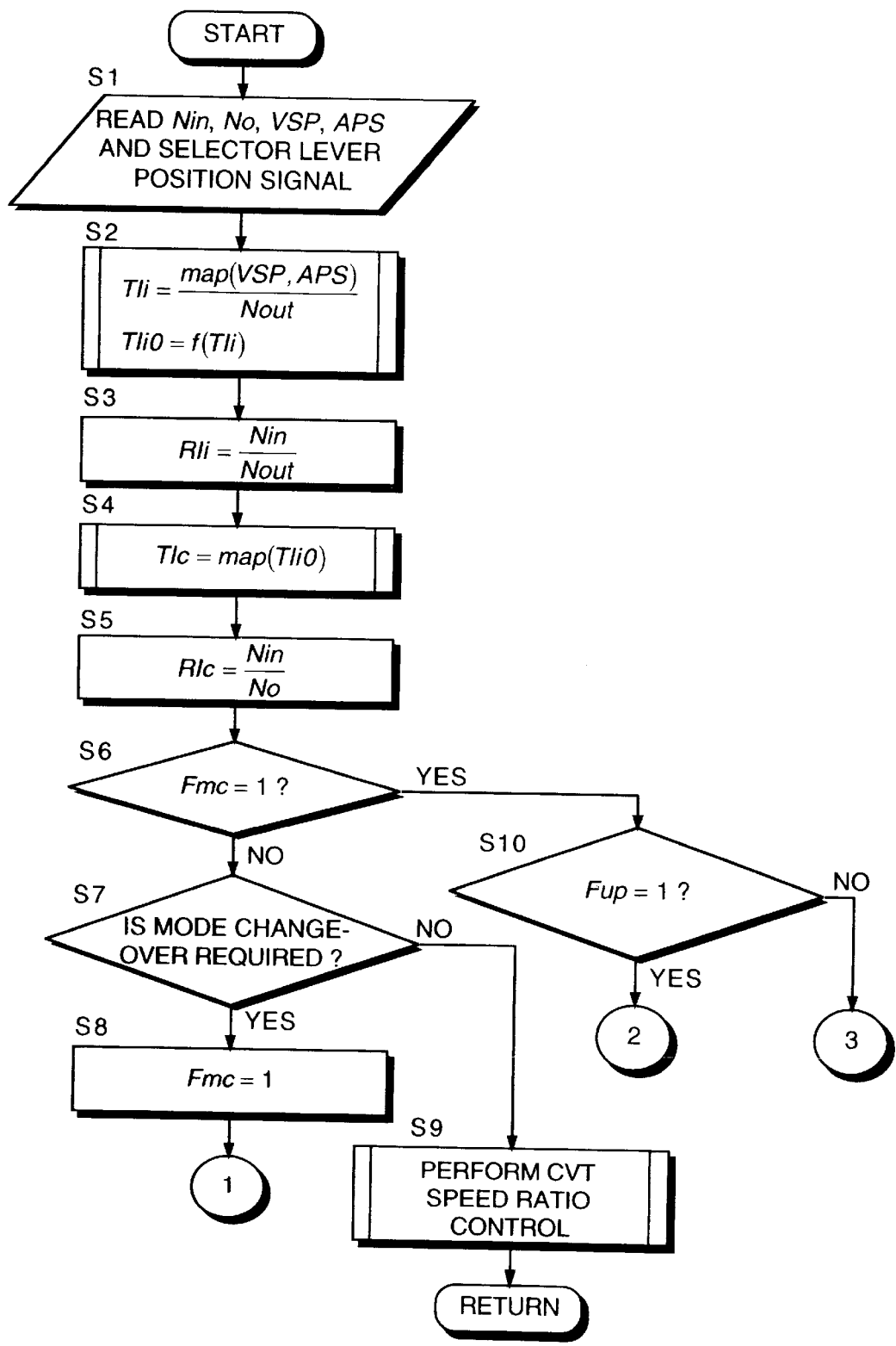
FIGS. 3A, 3B are flowcharts describing a speed change control routine performed by a control unit according to this invention.
Figure 3B:
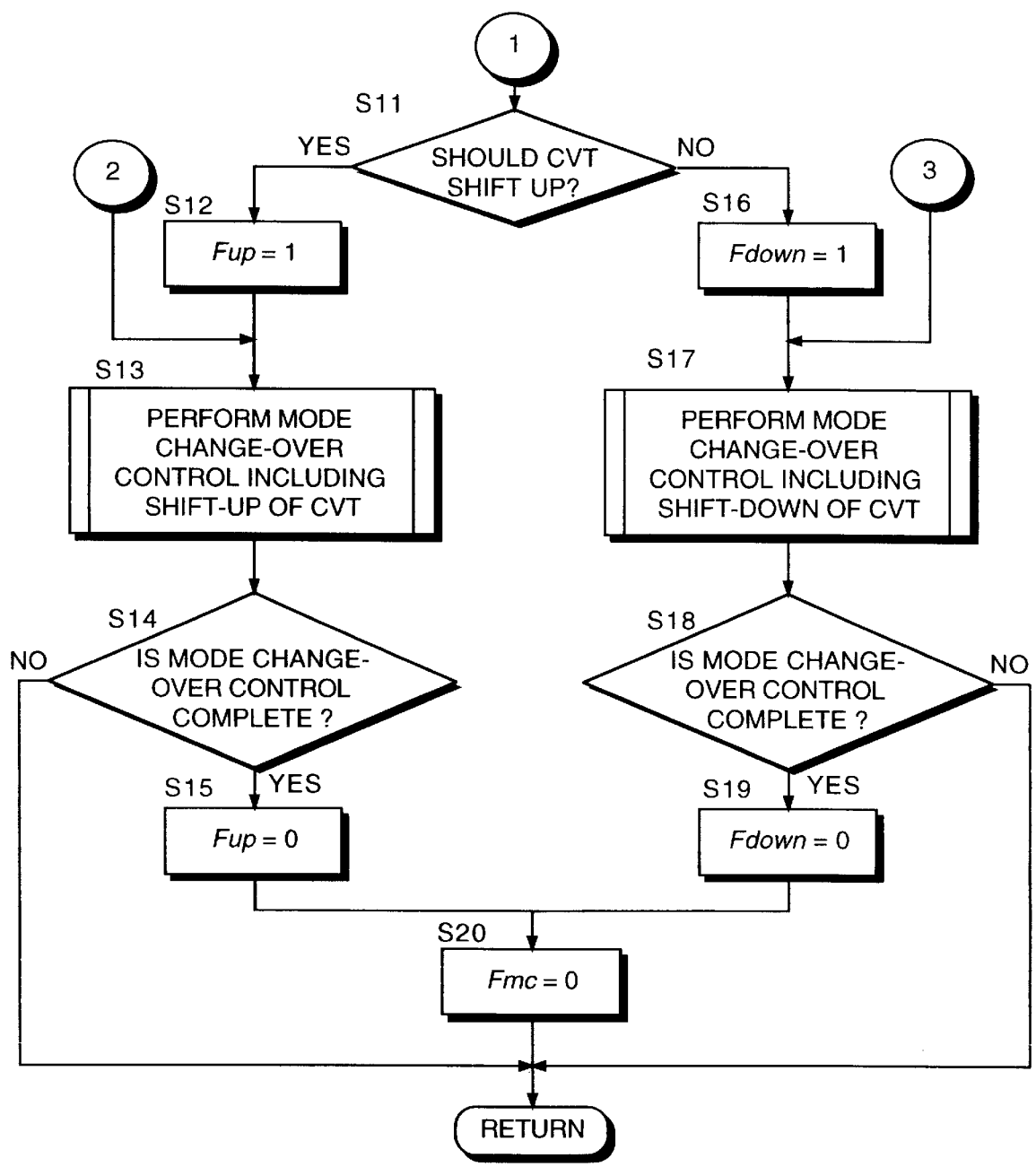

First, the main routine will be described referring to FIGS. 3A, 3B

In a step S1, the control unit 80 reads the input shaft rotation speed Ni, CVT output shaft rotation speed No, vehicle speed VSP and accelerator pedal depression amount APS detected by the above sensors.

Figure 6:
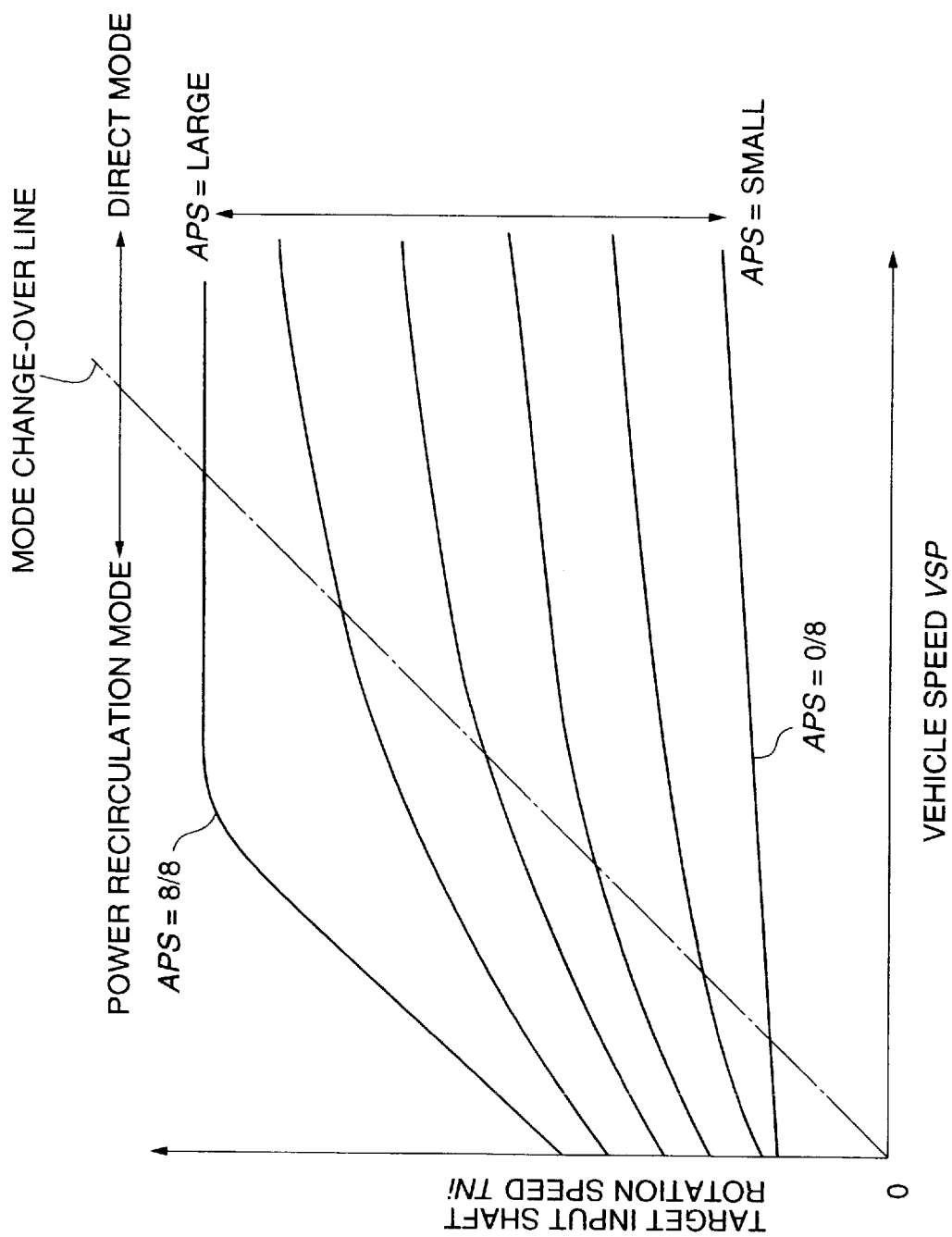
FIG. 6 is a diagram showing the characteristics of a map of a target input shaft rotation speed stored by the control unit.

In a step S2, a target input shaft rotation speed TNi is calculated from the accelerator pedal depression amount APS and vehicle speed VSP by looking up a map shown in FIG. 6. A final IVT speed ratio TIc is calculated by dividing the calculated target input shaft rotation speed TNi by the final output shaft rotation speed Nout detected by the vehicle speed sensor 83. Further, the target IVT speed ratio TIcO which takes account of a predetermined speed ratio response delay is calculated by processing the final IVT speed ratio TIc with a lowpass filter. It may be noted that the final IVT speed ratio TIc is a final target value of the IVT speed ratio Ii, and the target IVT speed ratio TIiO is a transient target value each time the routine controlling the IVT speed ratio Ii is executed, which is required for achieving the final IVT speed ratio TIi with a predetermined response speed. Further, from the map of FIG. 6, a running mode TMode is determined to achieve the final IVT speed ratio TIiO.

In the map of FIG. 6, when the target input shaft rotation speed TNi is in the region on the left of a mode change-over line shown by a dotted line, the power recirculation mode is the target running mode TMode, and when it is in the region on the right of the mode change-over line, the direct mode is the target running mode TMode.

In a next step S3, a real IVT speed ratio RIi is calculated by the equation RIi=Ni/Nout from the input shaft rotation speed Ni and final output shaft rotation speed Nout. Also, it is determined whether the current running mode Rmode is the power recirculation mode or the direct mode from the engaging state of the solenoids 91, 92.

Figure 7:
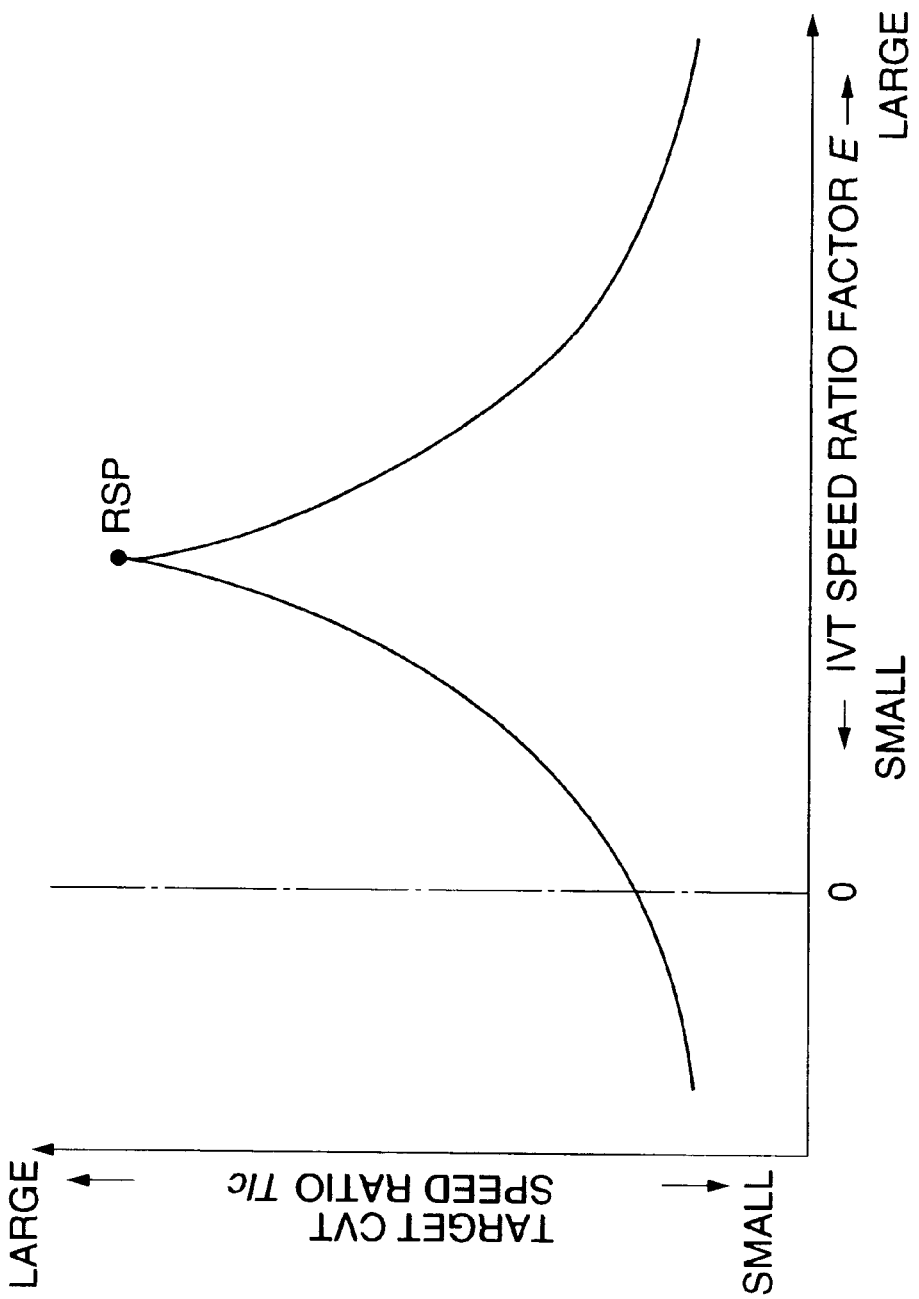
FIG. 7 is a diagram showing the characteristics of a map of a target CVT speed ratio stored by the control unit.

In a next step S4, the target CVT speed ratio TIc is found by looking up a map shown in FIG. 7 based on the target IVT speed ratio TIcO found in the step S2.

In order to look up the map, the target IVT speed ratio TIcO is converted into the IVT speed ratio factor E by the equation E=1/TIcO.

In a next step S5, the real CVT speed ratio RIc is calculated by the equation RIc=Ni/No from the input shaft rotation speed Ni and CVT output shaft rotation speed No.

In a next step S6, it is determined whether or not a mode change-over flag Fmc is 1. When the mode change-over flag Fmc is 1, the routine proceeds to a step S10. When the mode change-over flag Fmc is 0, the routine proceeds to a step S7.

In the step S7, it is determined whether or not a running mode change-over is necessary. This is determined from whether or not the target running mode TMode found in the step S2 and the real running mode RMode found in the step S3 coincide. If the two motor coincide, it is determined that a mode change-over is unnecessary, and if the two modes are different, it is determined that a running mode change-over is necessary. When it is determined that a mode change-over is unnecessary, the routine proceeds to a step S9, control of the CVT speed ratio Ic is performed based on the target CVT speed ratio TIc, and the routine is terminated. On the other hand, when it is determined that a mode change-over is necessary, the routine proceeds to a step S8.

In the step S8, the mode change-over flag Fmc is set to 1, and the routine proceeds to a step S11.

In the step S11, to start mode change-over control, the real CVT speed ratio RIc found in the step S5 and the target CVT speed ratio TIc found in the step S4 are compared, and it is determined whether to vary the CVT speed ratio Ic in the shift-up direction or shift-down direction.

When the target CVT speed ratio TIc is less than the real CVT speed ratio RIc, the shift-up direction is chosen. In this case, the routine proceeds to a step S12. Conversely, when the target CVT speed ratio TIc is larger than the real CVT speed ratio RIc, the shift-down direction is chosen. In this case, the routine proceeds to a step S16.

In the step S12, a shift-up flag Fup is set to 1, and the routine proceeds to a step S13.

On the other hand, if it is determined in the step S6 that the mode change-over flag Fmc is already set to 1, the routine determines whether or not the shift-up flag Fup is 1 in the step S10.

When the shift-up flag Fup is 1, the target CVT speed ratio TIc is situated at a position which is shifted up compared to the real CVT speed ratio Ic, and the CVT speed ratio Ic is varied in a decreasing direction. In this case, the routine proceeds to the step S13. When the shift-up flag Fup is 0, the routine proceeds to the step S17.

In the step S13, a running mode change-over including shift-up of the CVT 2 is performed by a subroutine described later. This operation comprises changing over the clutches 9 and 10, and decreasing the CVT speed ratio Ic.

In the next step S14, it is determined whether the mode change-over operation including shift-up of the CVT 2 has been completed. This is done by determining whether or not a clutch change-over flag Fc and CVT speed ratio control flag FIc have both been reset to 0. If both of these processes have terminated, it is determined that operations have been completed, and the routine proceeds to a step S15.

In the step S15, the shift-up flag Fup is reset to 0, and the routine proceeds to a next step S20.

On the other hand, if one of the clutch change over flag Fc and CVT speed ratio control flag FIc is 1, it signifies that the running mode change-over operation including shift-up of the CVT 2 is not complete, so the routine is terminated without modifying the shift-up flag Fup. Due to this processing, a running mode change-over operation including shift-up of the CVT 2 is performed again in the step S13 on the next occasion that the main routine is performed.

On the other hand, in the step S16, the shift-down flag Fdown is set to 1. Subsequently, the routine proceeds to the step S17.

In the step S17, a running mode change-over operation including shift-down of the CVT 2 is performed by a subroutine described later. This operation comprises change-over of the clutches 9 and 10, and increase of the CVT speed ratio Ic.

In a next step S18, it is determined whether or not a running mode change-over operation including shift-down of the CVT 2 has been completed. This is done by determining whether or not both the clutch change-over flag Fc and the CVT speed ratio control flag FIc have been reset to 0. When both of these processes have both terminated, it is determined that operations have been completed, and the routine proceeds to a step S19.

In the step S19, the shift-down flag Fdown is reset to 0, and the routine proceeds to the step S20.

In the step S18, when it is determined that one of the clutch change-over flag Fc and CVT speed ratio control flag FIc is 1, running mode change-over control including shift-down of the CVT 2 is not complete, so the routine is terminated without modifying the shift-down flag Fdown. Due to this processing, a running mode change-over operation including shift-down of the CVT 2 is performed again in the step S17 on the next occasion that the main routine is performed.

When the shift-up flag Fup is reset to 0 in the step S15 or the shift-down flag Fdown is reset to 0 in the step S19, the routine proceeds to the step S20. Here, the mode change-over flag Fmc is reset to 0 and the routine is terminated.

Next, the subroutine which performs running mode change-over control with shift-up of the CVT 2 in the step S13 will be described referring to the flowchart of FIG. 4.

In a first step S21, it is determined whether or not the clutch change-over flag Fc is 1. When the clutch change-over flag Fc is 1, the subroutine proceeds to a step S24. When the clutch change-over flag Fc is zero, the subroutine proceeds to a step S22.

In the step S22, it is determined whether or not the CVT speed ratio control flag FIc is set to 1. When the CVT speed ratio control flag FIc is 0, the clutch change-over flag Fc is set to 1 in a step S23, and the routine proceeds to the step S24.

In the step S24, clutch change-over is performed.

This operation is performed by controlling the excitation state of the solenoids 91, 92. When there is a shift from the power recirculation mode to the direct mode, a partially engaged state of the clutches 9, 10 is produced by gradually disengaging the power recirculation clutch 9 from the engaged state, and gradually engaging the direct clutch 10 from the disengaged state. After passing through this state, the direct clutch 10 is engaged and the power recirculation clutch 9 is disengaged. The change-over from the direct mode to the power recirculation mode is performed by the reverse process to the above.

In a next step S25, it is determined whether or not clutch change-over has been completed. As a result of clutch change-over, the IVT speed ratio Ii varies relative to the same CVT speed ratio Ic. Therefore, this determination may be performed by determining, for example at a predetermined CVT speed ratio Ica shown in FIG. 8, whether there has been a change from an IVT speed ratio Iic to Iia, or whether there has been a change in the reverse direction.

When clutch change-over is not complete in the step S25, the routine is terminated without performing other steps. As a result, clutch change-over is performed again in the step S24 on the next occasion this subroutine is executed. When clutch change-over is complete, the subroutine proceeds to a step S26.

In the step S26, the clutch change-over flag Fc is reset to 0, the CVT speed ratio control flag FIc is set to 1 in the following step S27, and the subroutine is terminated.

On the other hand, when the CVT speed ratio control flag FIc is set to 1 in the step S22, the subroutine proceeds to a step S28.

In the step S28, a signal corresponding to the target CVT speed ratio TIc found in the step S4 of the main routine is output to the step motor 36, and the CVT speed ratio Ic is varied toward the target CVT speed ratio TIc.

In a next step S29, it is determined whether or not the CVT speed ratio control has been completed. This is done by determining whether or not the real CVT speed ratio RIc is equal to the target CVT speed ratio TIc. When the real CVT speed ratio RIc is not equal to the target CVT speed ratio TIc, the CVT speed ratio control is not complete. In this case, the subroutine is terminated without performing other steps. As a result, the CVT speed ratio control is performed again in the step S28 on the next occasion when the subroutine is executed. When the CVT speed ratio control is complete, the subroutine proceeds to a step S30.

In the step S30, the CVT speed ratio control flag FIc is reset to 0 and the subroutine is terminated.

In this subroutine, firstly, the clutch change-over operation is completed, and a shift-up operation of the CVT 2 is then performed.

In FIG. 8, when there is a shift-down of the IVT from a point A to a point B, the control unit 80 first engages the power recirculation clutch 9 and disengages the direct clutch 10 while the CVT speed ratio Ic is fixed at Ica. As a result, the IVT speed ratio Ii increases from Iia to Iic. Subsequently, the CVT 2 shifts down from the speed ratio Ica to a speed ratio Icb due to the signal output to the step motor 36. Due to this variation of the CVT speed ratio Ic, the IVT speed ratio Ii increases further from Iic to Iib. In other words, the IVT speed ratio Ii shifts down progressively from the point A to the point B via the point C. Therefore, there is no change in the shift direction of the IVT during the operation, as shown in FIG. 9.

Figure 9:
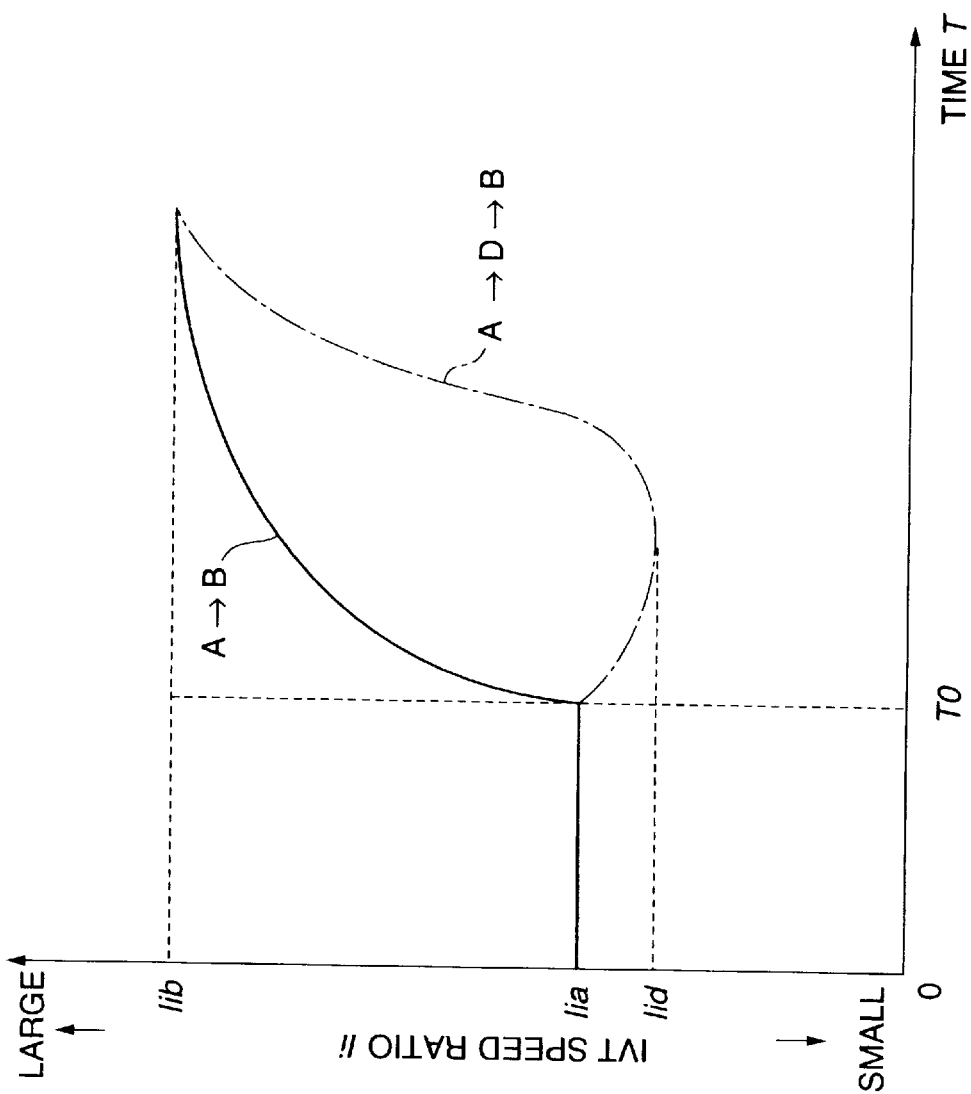
FIG. 9 is a timing chart describing the variation of the IVT speed ratio Ii when the IVT performs a shift-down while the CVT performs a shift-up.

On the other hand, if the CVT speed ratio Ic varies from Ica to a value Icb corresponding to the point B and a clutch change-over is then performed, the IVT speed ratio Ii reaches the point B from the point A via a point D, so the shift direction does vary during the operation as shown by the dotted line in FIG. 9.

Next, in FIG. 8, the case will be considered where the IVT shifts up from the point C to the point D. In this case also, the control unit 80 first disengages the power recirculation clutch 9 and engages the direct clutch 10 while the CVT speed ratio Ic is fixed at Ica. As a result, the IVT speed ratio Ii decreases from Iic to Iia. Subsequently, the control unit 18 shifts the CVT speed ratio Ic up from Ica to Icb due to a signal output to the step motor 36. As a result of this variation of the CVT speed ratio Ic, the IVT speed ratio Ii further decreases from Iia to Iid. In other words, the IVT speed ratio Ii progressively shifts up from the point C to the point D via the point A. Therefore, in this case also there is no change in the shift direction of the IVT during the operation. On the other hand, if the CVT speed ratio Ic is first varied from Ica to Icb and a clutch change-over is then performed, the IVT speed ratio Ii reaches the point D from the point C via the point B, so there is a change in the shift direction of the IVT during the operation.

Next, the routine for performing change-over of running mode accompanied by a shift-down of the CVT 2 performed in the step S17 will be described referring to the flowchart of FIG. 5.

In a first step S31, is determined whether or not the CVT speed ratio control flag FIc is 1. When the CVT speed ratio control flag FIc is 1, the subroutine proceeds to a step S37. When the CVT speed ratio control flag FIc is 0, the subroutine proceeds to a step S32.

In the step S32, it is determined whether or not the clutch change-over flag Fc is 1. When the clutch change-over flag Fc is 0, the CVT speed ratio control flag FIc is set to 1 in a step S33, and the routine proceeds to a step S37.

In the step S37, a signal is output to the step motor 36 based on the target CVT speed ratio TIc found in the step S4 of the main routine, and the CVT speed ratio Ic is varied towards the target CVT speed ratio TIc.

In a next step S38, it is determined whether or not the CVT speed ratio control has been completed. This is done by determining whether or not the real CVT speed ratio RIc has become equal to the target CVT speed ratio TIc. If the real CVT speed ratio RIc is not equal to the target CVT speed ratio TIc, the CVT speed ratio control is not complete. In this case, the subroutine is terminated without performing other steps. As a result, the CVT speed ratio control is again performed in the step S37 on the next occasion that this subroutine is performed. If the CVT speed ratio control has been completed, the subroutine proceeds to a step S39.

In the step S39, the CVT speed ratio control flag FIc is reset to 0, and the routine proceeds to a step S40. In the step S40, the clutch change-over flag Fc is set to 1 and the subroutine is terminated.

On the other hand, in the step S34, clutch change-over is performed.

This operation is performed by controlling the excitation states of the solenoids 91, 92. When there is a shift from the direct mode to the power recirculation mode, a partially engaged state of the clutches 9, 10 is produced by gradually disengaging the direct clutch 10 from the engaged state, and gradually engaging the power recirculation clutch 9 from the disengaged state. After passing through this state, the power recirculation clutch 9 is engaged and the direct clutch 10 is disengaged. The change-over from the direct mode to the power recirculation mode is performed by the reverse process to the above.

Figure 4:
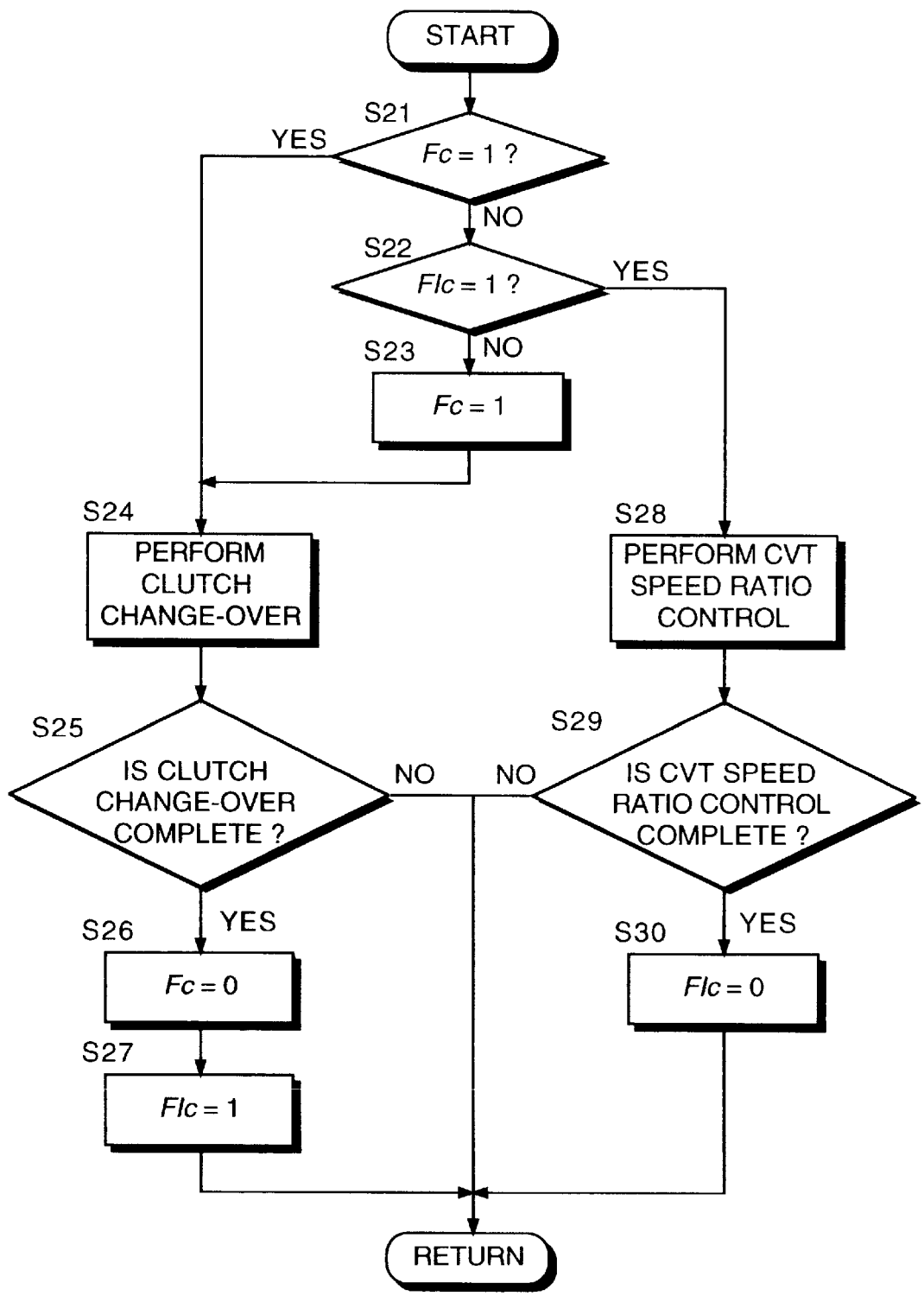
FIG. 4 is a flowchart describing a subroutine performed by the control unit to perform an operation mode changeover including a shift-up of a continuously variable transmission (CVT) which is a part of the IVT.

In a next step S35, is determined whether or not clutch change-over has been completed by an identical method to that of the step S25 of FIG. 4. When change-over is not complete, the subroutine is terminated without performing further steps. As a result, clutch change-over is again performed in the step S34 on the next occasion that this subroutine is performed. When it is determined that clutch change-over is complete, the subroutine proceeds to a step S36. In the step S36, the clutch change -over flag Fc is reset to 0 and the subroutine is terminated.

In this subroutine, the shift-down operation of the CVT 2 is first completed, and the clutch change-over operation is then performed.

For example, in FIG. 8, if the IVT is shifted down from the point A to the point B' in the figure, the control unit 80 first shifts the CVT down from the speed ratio Ica to the speed ratio Icb by outputting a signal to the step motor 36. Due to this variation of the CVT speed ratio Ic, the IVT speed ratio Ii increases from Iia to Iid'.

Figure 10:
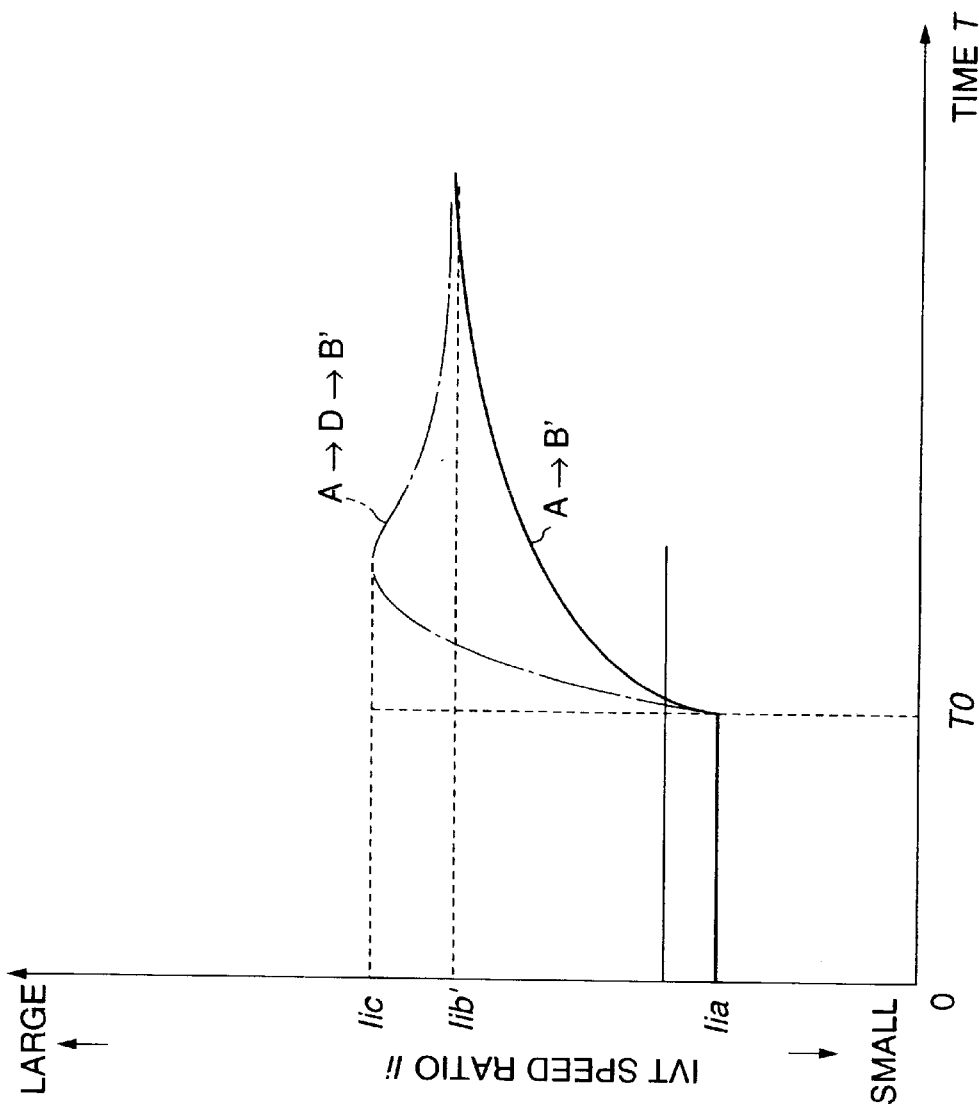
FIG. 10 is a timing chart describing the variation of the IVT speed ratio Ii when both the IVT and CVT perform a shift-down.

Next, the CVT speed ratio Ic is fixed at Icb', then disengaging of the direct clutch 10 and engaging of the power recirculation clutch 9 are performed. As a result, the IVT speed ratio Ii further increases from Iid' to Icb'. In other words, the IVT speed ratio Ii progressively shifts down from the point A to the point B' via the point D'. Therefore, there is no change in shift direction of the IVT during the operation, as shown by the solid line in FIG. 10. On the other hand, when there is a clutch change-over and the CVT speed ratio Ic is then varied from Ica to Icb', the IVT speed ratio Ii reaches the point B' from the point A via the point C in FIG. 8, and the shift direction does change during the operation as shown by the dotted line in FIG. 10.

Next, the case will be considered where the IVT is shifted up from the point C to the point D' in FIG. 8. In this case also, the control unit 80 shifts the CVT 2 down from the speed ratio Ica to the speed ratio Icb' by outputting a signal to the step motor 36. Due to this change of the CVT speed ratio Ic, the IVT speed ratio Ii decreases from Iic to Iib'.

Next, the CVT speed ratio is fixed at Icb', then engaging of the direct clutch 10 and disengaging of the power clutch 9 are performed. As a result, the IVT speed ratio Ii further decreases from Iib' to Iid'. In other words, the IVT speed ratio Ii progressively shifts up from the point C to the point D' via the point B'. Therefore in this case also, the shift direction of the IVT does not change during the operation. On the other hand, if there is a clutch change-over and the CVT speed ratio Ic is then varied from Ica to Icb', the IVT speed ratio Ii reaches the point D' from the point C via the point A, so the shift direction does change during operation.

When the IVT speed ratio Ii varies beyond the rotation synchronous point RSP, whether to perform clutch change-over first or variation of the CVT speed ratio Ic first is determined as follows:

| CVT/ IVT | shift-up | shift-down |
|---|---|---|
| shift-up | clutch change-over | CVT speed ratio control |
| shift-down | clutch change-over | CVT speed ratio control |

In other words, it is determined according to the variation direction of the CVT speed ratio Ic irrespective of the variation direction of the IVT speed ratio Ii.

When the IVT speed ratio Ii is varied, by changing the order of the clutch change-over and CVT speed ratio control based on a comparison of the real CVT speed ratio RIc and target CVT speed ratio TIc, the variation of the IVT speed ratio Ii due to clutch change-over and the variation of the IVT speed ratio Ii due to the variation of the CVT speed ratio Ic can thus be given the same direction. Therefore, a fast mode change-over due to the partially engaged state of the clutches can be performed without giving an uncomfortable feeling to the driver.

Further, the clutch change-over operation and CVT speed ratio control are not performed simultaneously, the computational load on the control unit 80 is small, and therefore increase in the manufacturing cost of the speed ratio controller is suppressed.

Next, a second embodiment of this invention will be described referring to FIGS. 11, 12, 13. 14A–14C and 15.

Figure 5:
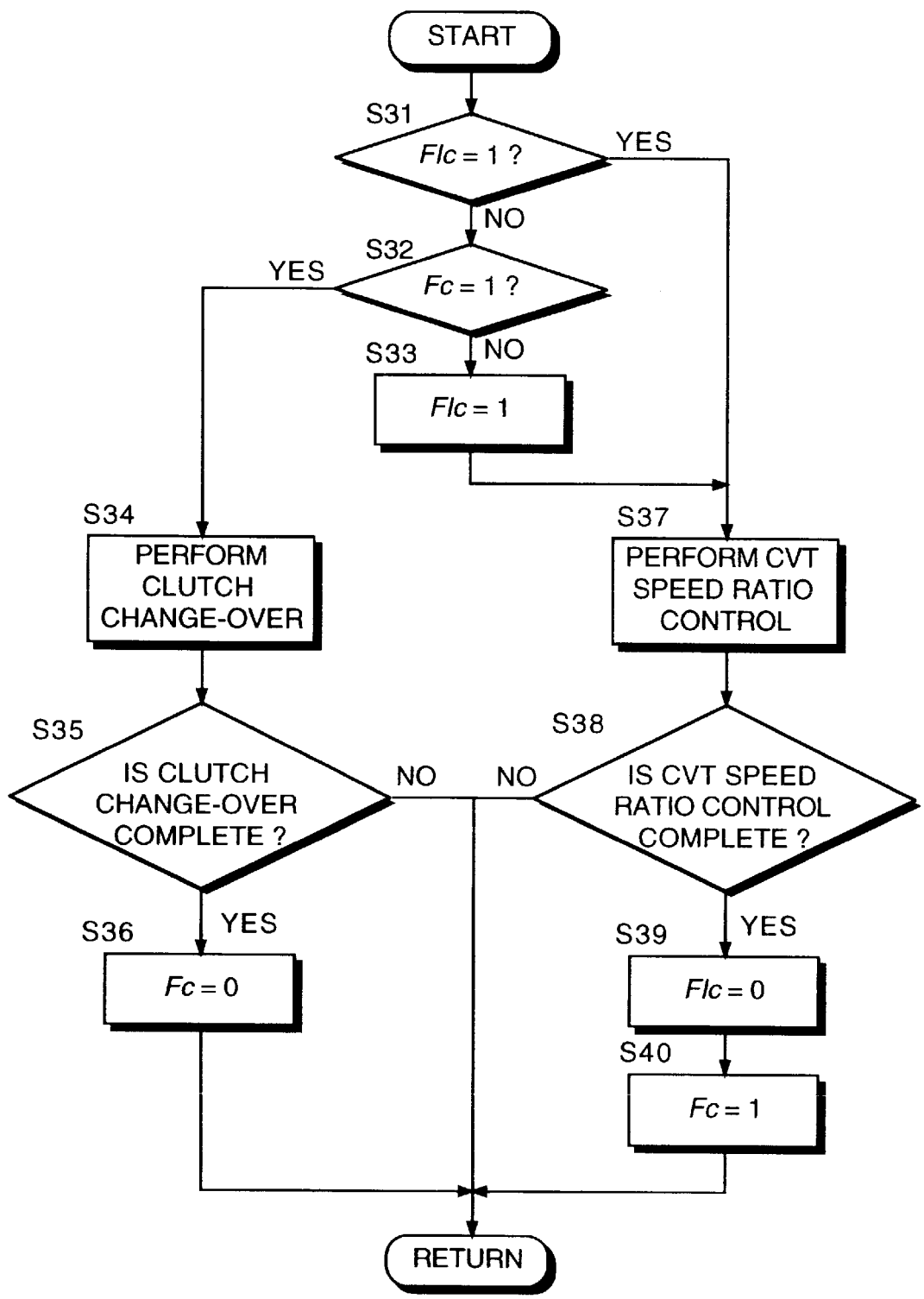
FIG. 5 is a flowchart describing a subroutine performed by the control unit to perform an operation mode changeover including a shift -down of the CVT.
Figure 11:
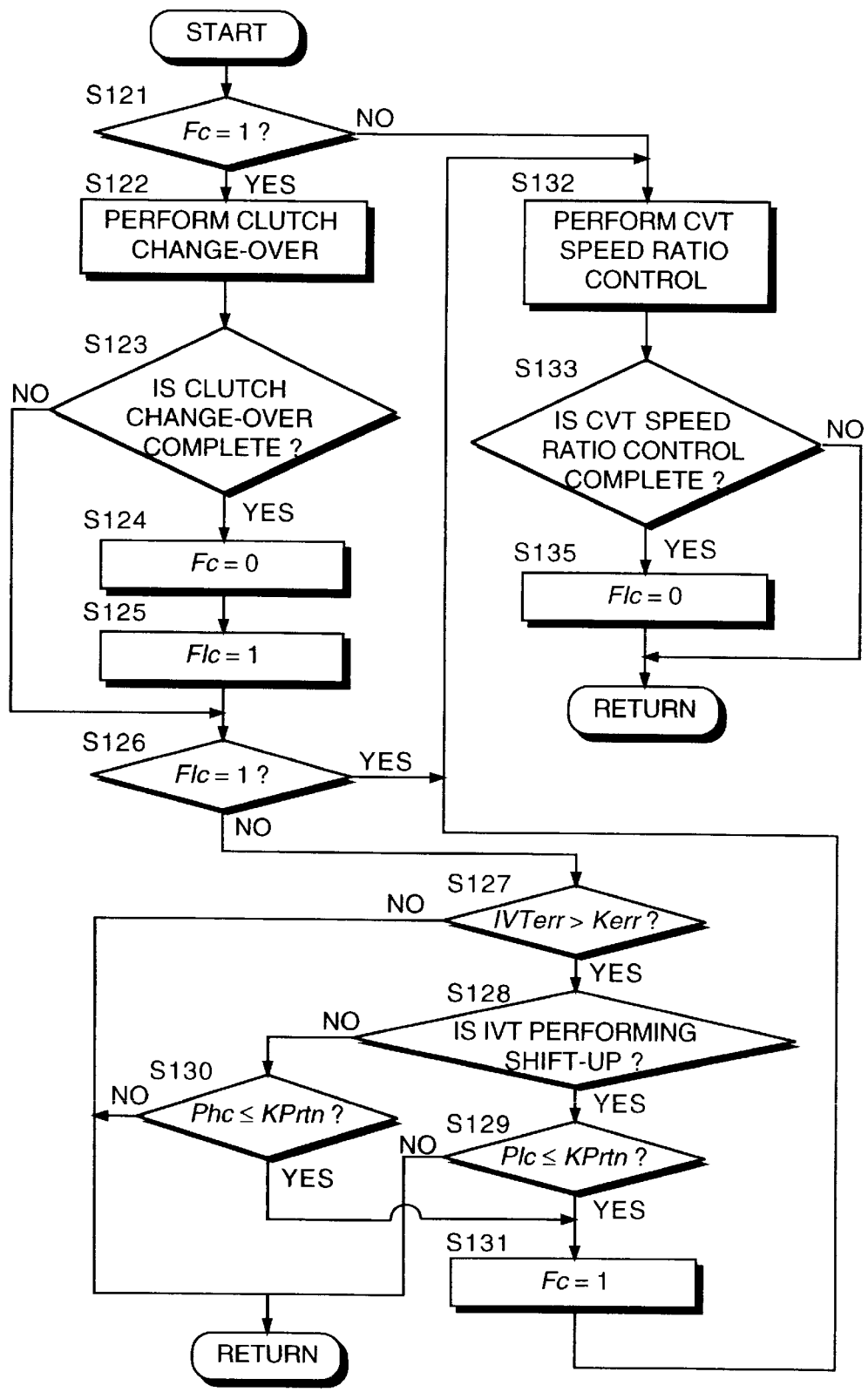
FIG. 11 is a flowchart describing a subroutine for changing over the IVT operation mode including a shift-up of the CVT performed by the control unit according to a second embodiment of this invention.
Figure 12:
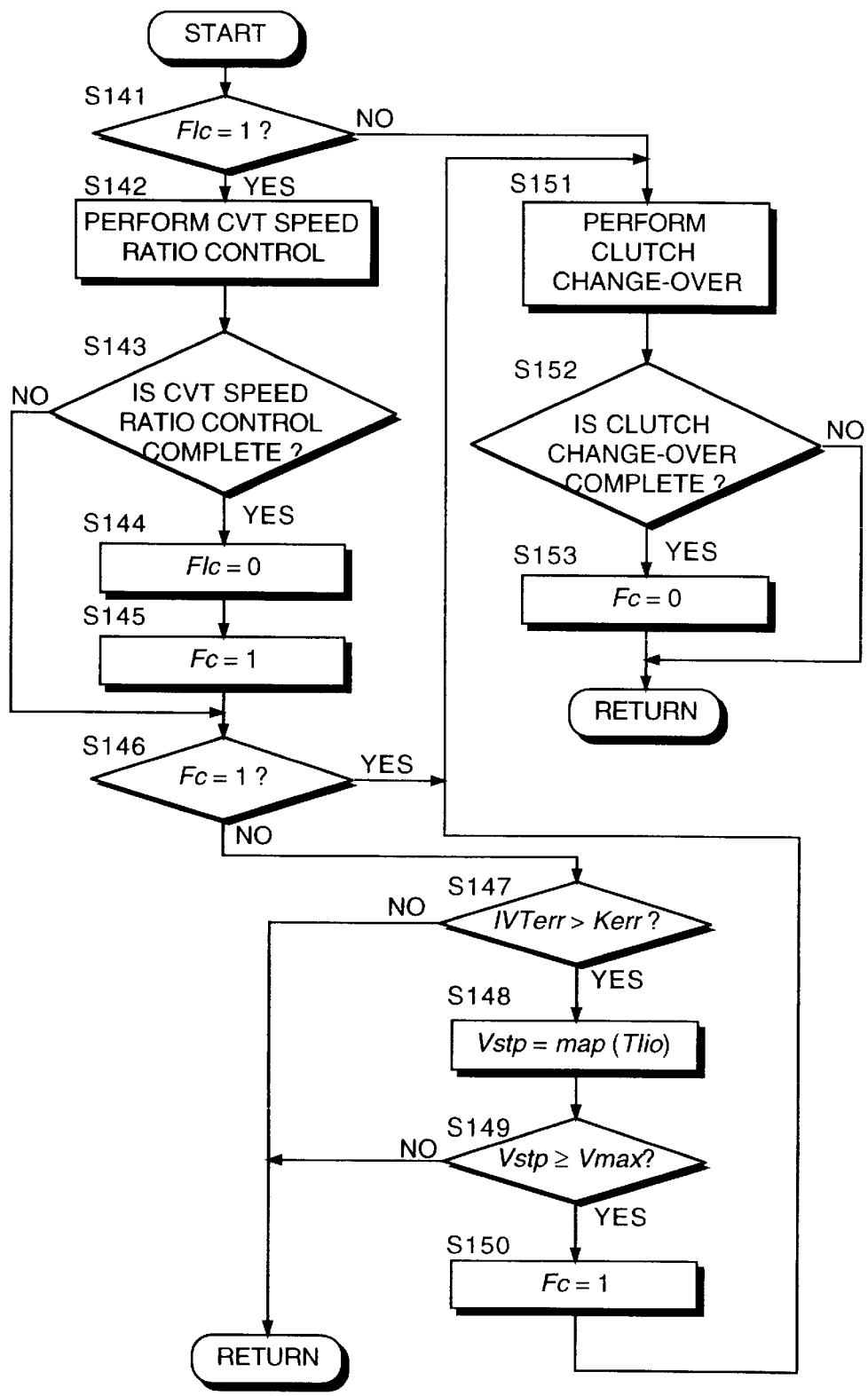
FIG. 12 is a flowchart describing a subroutine for changing over the IVT operation mode including a shift-down of the CVT performed by the control unit according to the second embodiment of this invention.

According to this embodiment, a subroutine shown in FIG. 11 is used instead of the subroutine of FIG. 4, and a subroutine shown in FIG. 12 is used instead of the subroutine of FIG. 5. The remaining features of the construction are identical to those of the first embodiment.

FIG. 11 shows the subroutine for performing running mode change-over control with shift-up of the CVT 2.

In a first step S121, it is determined whether or not the clutch change-over flag Fc is 1. When the clutch change-over flag Fc is 1, the subroutine proceeds to a step S122. When the clutch change-over flag Fc is 0, the subroutine proceeds to a step S132.

In the step S122, the same clutch change-over operation is performed as in the step S24 of the first embodiment.

In a next step S123, it is determined whether or not the clutch change-over operation has been completed. According to this embodiment, unlike the step S25 of the first embodiment, determination of completion of clutch change-over is performed by the following method.

The power recirculation clutch 9 and direct clutch 10 are both engaged by supplying oil pressure and disengaged by releasing oil pressure. In order to ensure that the clutch is disengaged when the oil pressure is released, the clutches comprise a return spring which presses a clutch member in the disengaging direction against an oil pressure.

Hence, the completion of clutch change-over is determined by monitoring an oil pressure of a clutch which shifts from the disengaged state to the engaged state. For example, in the case where the IVT shifts up, when an oil pressure Phc of the direct clutch 10 is equal to or greater than a pressure KPrtn of the return spring and a difference in rotation speeds of the two clutches is 0, it is determined that clutch change-over is complete. In the case where the IVT shifts down, when an oil pressure PIc of the power recirculation clutch 9 is equal to or greater than the pressure KPrtn of the turn spring and the difference in rotation speeds of the two clutches is 0, it is determined that clutch change-over is complete. The oil pressures of the clutches are effectively equal to the torques transmitted by the clutches, and when the oil pressure is lower than the return spring pressure KPrtn, the transmitted torque is zero.

Herein, the oil pressure PIc of the power recirculation clutch 9 and the oil pressure Phc of the direct clutch 10 may be found from the duty ratio of the duty signals output to the solenoids 91, 92 from the control unit 80.

The rotation speeds of the clutches 9 and 10 mean the rotation speeds of members which receive the torque via the clutches 9 and 10. In the power recirculation mode, the rotation speed of the power recirculation clutch 9 is represented by the rotation speed of the planet carrier 5B, and the rotation speed of the direct mode clutch 10 is represented by the rotation speed of the CVT output shaft 4.

In the direct mode, the rotation speed of the power recirculation clutch 9 is represented by the rotation speed of the gear output shaft 3C of the reduction gear, and the rotation speed of the direct clutch 10 is represented by the rotation speed of the final output shaft 6. Of these, the rotation speed No of the CVT output shaft 4 and the rotation speed Nout of the final output shaft 6 may be found directly from the output signals of the rotation speed sensor 82 and vehicle speed sensor 83. The rotation speed of the gear output shaft 3C may be found by dividing a rotation speed Nin of the input shaft 1 detected by the rotation speed sensor 81, by the speed ratio of the reduction gear 3. Further, the rotation speed of the planet carrier 5B may be found by calculation from the rotation speed No of the CVT output shaft 4 and the rotation speed Nout of the final output shaft 6.

As a result of the determination of the step S123, when clutch change-over has not been completed, the subroutine proceeds to a step S126. When clutch change-over has been completed, the subroutine resets the clutch change-over flag Fc to 0 in a step S124, resets the CVT speed ratio control flag FIc to 1 in a step S125, and proceeds to the step S126. When clutch change-over is not complete, the clutch change-over flag Fc remains at 1, so the clutch change-over operation of the step S122 is again performed on the next occasion that the subroutine is executed.

In the step S126, it is determined whether or not the CVT speed ratio control flag FIc is 1. When the CVT speed ratio control flag FIc is 1, the subroutine proceeds to a step S132, and CVT speed ratio control, described later, is performed. On the other hand, when the CVT speed ratio control flag FIc is 0, the subroutine proceeds to a step S127.

In the step S127, whether or not the real IVT speed ratio RIi is following the target IVT speed ratio TIiO is determined by the following method. Specifically, when the difference IVTerr of the target IVT speed ratio TIiO and real IVT speed ratio RIi is greater than a predetermined value Kerr, it is determined that the real IVT speed ratio RIi is not following the target IVT speed ratio TIiO. When the difference IVTerr is equal to or less than the predetermined value Kerr, it is determined in the real IVT speed ratio RIi is following the target IVT speed ratio TIiO. In the former case, the subroutine proceeds to a step S128, and in the latter case, the subroutine is terminated without proceeding to other steps.

In the step S128, it is determined whether or not the IVT is performing a shift-up by comparing the target IVT speed ratio TIiO and real IVT speed ratio RIi During a shift-up, the subroutine proceeds to a step 29, and in other cases the subroutine proceeds to a step S130.

In the step S129, it is determined whether or not the oil pressure of the power recirculation clutch 9 has fallen sufficiently. If the oil pressure of the power recirculation clutch 9 has not fallen sufficiently and CVT speed ratio control is begun, the IVT speed ratio Ii may momentarily vary in an opposite direction to the intended direction due to the transmission torque of the power recirculation clutch 9. To prevent this behavior of the IVT, in the step S129, it is determined whether or not the oil pressure Plc of the power recirculation clutch 9 has become equal to or less than the return spring pressure KPrtn. Also in the step S130, by the same reasoning, it is determined whether or not the oil pressure Phc of the direct clutch 10 has become equal to or less than the return spring pressure KPrtn.

In the step S129 or the step S130, when the clutch pressure exceeds the return spring pressure KPrtn, the subroutine is terminated without performing other steps. As a result, the same determination is again performed on the next occasion that the subroutine is executed, and the CVT speed ratio control of the step S131 and subsequent steps is not performed until the clutch pressure becomes equal to or less than the return spring pressure KPrtn.

In the step S129 or the step S130, when the clutch pressure has become equal to or less than the return spring pressure KPrtn, the subroutine sets the CVT speed ratio control flag FIc to 1 in the step S131, and proceeds to the CVT speed ratio control of the step S132 and subsequent steps.

The processing of the step S132 is identical to the processing of the step S28 of the first embodiment. In other words, a signal corresponding to the target CVT speed ratio TIc found in the step S4 of the main routine is output to the step motor 36, and the CVT speed ratio Ic is varied towards the target CVT speed ratio TIc.

The processing of a next step S133 is identical to the processing of the step S29 of the first embodiment. In other words, it is determined whether or not the CVT speed ratio control is complete by determining if the real CVT speed ratio RIc is equal to the target CVT speed ratio TIc. When the real CVT speed ratio RIc is not equal to the target CVT speed ratio TIc, the CVT speed ratio control is not complete. In this case, the routine is terminated without performing further steps. As a result, the CVT speed ratio control is performed again in the step S132 on the next occasion that the subroutine is executed. On the other hand, when the real CVT speed ratio RIc is equal to the target CVT speed ratio TIc, the subroutine proceeds to a step S135, the CVT speed ratio control flag FIc is reset to 0 and the subroutine is terminated.

In this embodiment also, when there is a running mode change-over accompanying shift-up of the CVT 2, a clutch change-over operation is first begun, and if the difference IVTerr between the target IVT speed ratio TIiO and real IVT speed ratio RIi is larger than the predetermined value Kerr, the CVT speed ratio control is performed in parallel with the clutch change-over operation. In other words, by giving priority to the clutch change-over operation, change in the shift direction of the IVT is prevented, and by performing the CVT speed ratio control in parallel with the clutch change-over operation if necessary, delay in the speed ratio variation is prevented and a fast response is obtained.

The predetermined value Kerr which is a reference for determining the speed ratio variation delay represents an allowable maximum discrepancy between the target IVT speed ratio TIiO and real IVT speed ratio RIi to ensure that the vehicle runs without giving an uncomfortable feeling to the driver, and it is found by experiment.

Next, the case will be considered where the IVT shifts down from the point A to the point B in FIG. 8 under this subroutine.

The control unit 80 first starts to engage the power recirculation clutch 9 and disengage the direct clutch 10 while the CVT speed ratio Ic is fixed at Ica. As a result, the real IVT speed ratio varies from the point A to the point C, but during this process, the difference IVTerr exceeds the predetermined value Kerr. Further, when the clutch pressure of the power recirculation clutch 9 has become equal to or less than the return spring pressure KPrtn at the point E, the control unit 80 begins CVT speed ratio control in parallel with the clutch change-over operation by outputting a signal corresponding to the target CVT speed ratio TIc to the step motor 36.

Due to this CVT speed ratio control, the CVT speed ratio Ic varies from Ica to Icb. As a result, the IVT speed ratio varies from the point E to the point B without passing through the point C. Therefore, the IVT speed ratio Ii continues to follow the target value of the IVT speed ratio during the speed change control without any reversal of direction, and a rapid speed change is achieved without giving an uncomfortable feeling to the driver.

Next, the case will be considered where the IVT shifts up from the point C to the point D in FIG. 8. In this case, the control unit 80 first starts to disengage the power recirculation clutch 9 and engage the direct clutch 10 while the CVT speed ratio Ic is fixed at Ica.

If the IVT speed ratio Ii exceeds the predetermined value Kerr during this operation, CVT speed ratio control is begun by outputting a signal corresponding to the target CVT speed ratio TIc to the step motor 36 when the clutch pressure of the power recirculation clutch 9 has become equal to or less than the return spring pressure KPrtn. As a result, the IVT speed ratio varies from the point E to the point D without passing through the point A. Therefore, the IVT speed ratio Ii continues to follow the target value of the IVT speed ratio during the speed change control without any reversal of direction, and a rapid speed change is achieved without giving an uncomfortable feeling to the driver.

Next, the running mode change-over control accompanying a shift-down of the CVT 2 will be described referring to the flowchart of FIG. 12.

In a first step S141, it is determined whether or not the CVT speed ratio control flag FIc is 1. When the CVT speed ratio control flag FIc is 1, the subroutine proceeds to a step S142, When the CVT speed ratio control flag FIc is 0, the subroutine proceeds to a step S151.

In the step S142, in the same way as in the step S37 of the first embodiment, a signal is output to the step motor 36 based on the target CVT speed ratio Ic found in the step S4 of the main routine, and the CVT speed ratio Ic is varied towards the target CVT speed ratio TIc.

In a next step S143, in the same way as in the step S38, it is determined whether or not the CVT speed ratio control is complete. When the CVT speed ratio control is not complete, the subroutine proceeds to a step S146. When the CVT speed ratio control is complete, the subroutine resets the CVT speed ratio control flag FIc to 0 in a step S144, sets the clutch change-over flag Fc to 1 in a step S145, and proceeds to a step S146. When the CVT speed ratio control is not complete, the CVT speed ratio control flag FIc remains set at 1, so the CVT speed ratio control is again continued in the step S142 on the next occasion that the subroutine is executed.

In the step S146, it is determined whether or not the clutch change-over flag Fc is 1. When the clutch change-over flag FC is 1, the subroutine proceeds to a step S151, and a clutch change-over operation described later is performed.

On the other hand, when the clutch change-over flag Fc is 0, the subroutine proceeds to a step S147.

In the step S147, it is determined whether or not the real IVT speed ratio RIi is following the target IVT speed ratio TIiO by the following method. Specifically, when the difference IVTerr between the target IVT speed ratio TIiO and real IVT speed ratio RIi is greater than the predetermined value Kerr, it is determined that the real IVT speed ratio RIi is not following the target IVT speed ratio TIiO. When the difference IVTerr is equal to or less than the predetermined value Kerr, it is determined in the real IVT speed ratio RIi is following the target IVT speed ratio TIiO. In the former case, the subroutine proceeds to a step S148, and in the latter case, the subroutine is terminated without proceeding to other steps.

In the step S148, a step motor target operation speed VStp is computed.

In a following step S149, it is determined whether or not the step motor target operation speed VStp exceeds a operation speed limit Vmax of the step motor 36. When the step motor target operation speed VStp exceeds the operation speed limit Vmax, it is determined that the difference IVTerr cannot be canceled out by CVT speed ratio control alone, and the routine proceeds to a step S150.

In the step S150, the clutch change-over flag Fc is set to 1, and the routine proceeds to the clutch change-over operation of the step S151.

Figure 13:
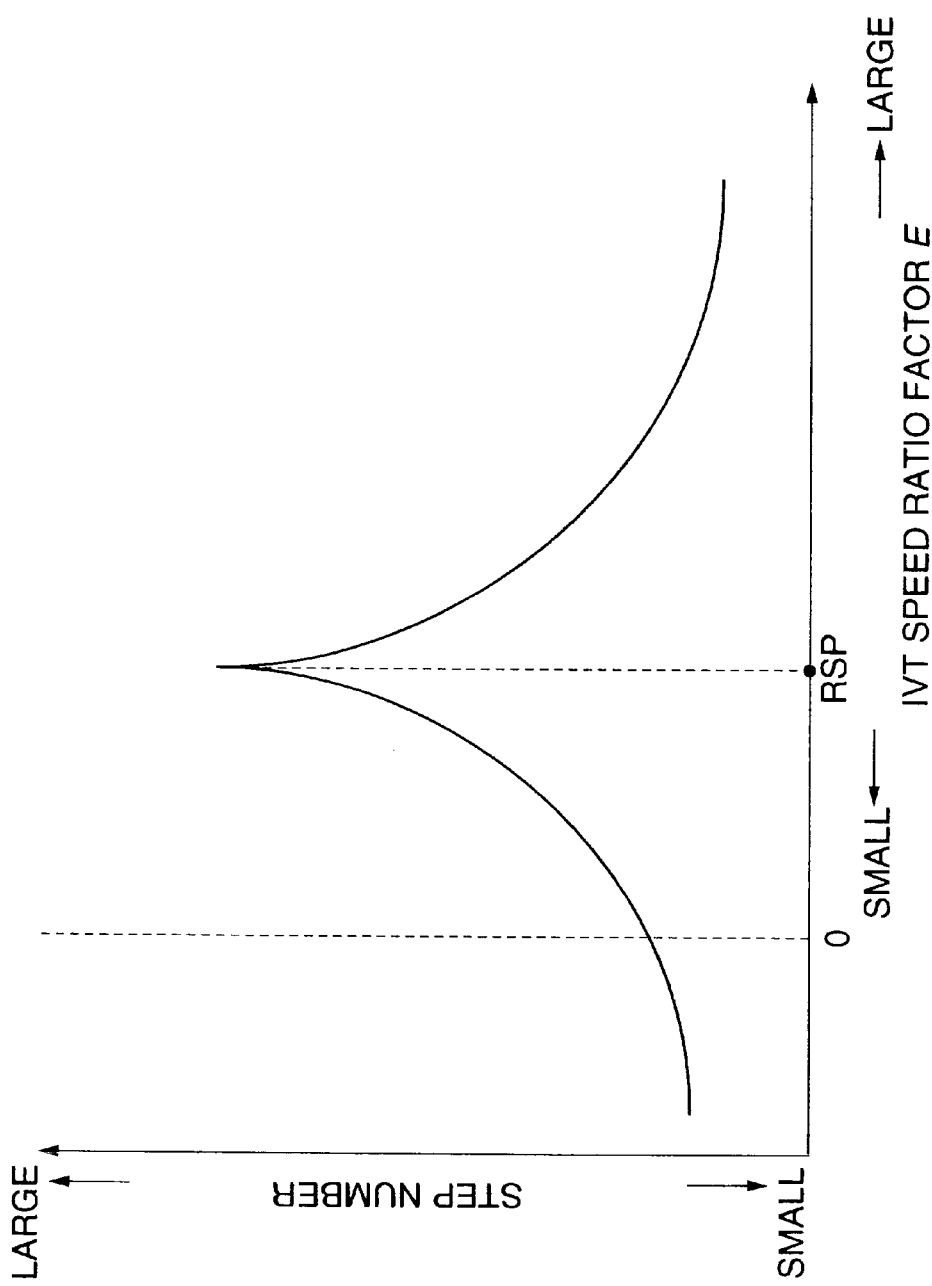
FIG. 13 is a diagram showing the characteristics of a map of step number of a step motor stored by the control unit according to the second embodiment of this invention.

The step motor drive speed VStp may be found by looking up a map which defines the relation of the IVT speed ratio factor E and a step number of the step motor 36 as shown in FIG. 13.

The map of FIG. 13 is prestored in the control unit 80, and the control unit 80 calculates the step number from the IVT speed ratio factor E corresponding to the target IVT speed ratio TIiO by referring to this map. The step motor target drive speed VStp is found by first calculating a difference between the step number and the step number calculated on the immediately preceding occasion when the subroutine was executed, and dividing the difference by the execution interval of the subroutine.

In the step S149, when the step motor target operation speed VStp does not exceed the operation speed limit Vmax of the step motor 36, the IVT speed ratio difference IVTerr can be canceled out by controlling only the step motor 36. Therefore, the subroutine is terminated without performing the clutch change-over operation.

In the step S151, the same clutch change-over operation is performed as in the step S34 of the first embodiment.

In a next step S152, whether or not the clutch change-over operation is complete is determined by the same method as that of the step S123. When the clutch change-over operation is not complete, the subroutine is terminated without performing other steps. In this case, the clutch change-over flag Fc remains set at 1, so the clutch change-over operation of the step S151 is again continued on the next occasion that the subroutine is executed. On the other hand, when the clutch change-over operation is complete in the step S152, the routine proceeds to a step S153, the clutch change-over flag Fc is reset to 0, and the subroutine is terminated.

Therefore, in a running mode change-over accompanying shift-down of the CVT 2, the CVT speed ratio Ic is first controlled to the target CVT speed ratio TIc, and when the difference IVTerr between the target IVT speed ratio TIiO and the real IVT speed ratio RIi is greater than the predetermined value Kerr, it is determined that speed change is delayed. Herein, the target IVT speed ratio TIcO is a transient target value which is set each time the routine for controlling the IVT speed ratio Ii is performed, so the predetermined value Kerr may be exceeded later even if the difference IVTerr is less than the predetermined value Kerr when control of the CVT speed ratio Ic begins.

In such a case, if the step motor target operation speed VStp also exceeds the operation speed limit Vmax of the step motor 36, the clutch change-over operation begins in parallel with the CVT speed ratio control.

For example, when there is a shift-down of the IVT from the point D to the point B' in FIG. 8, the CVT speed ratio Ic is first increased from Icb to Icb' by outputting a signal corresponding to the target CVT speed ratio TIc to the step motor 36.

At the point A in this process, the difference IVTerr of the target IVT speed ratio TIiO and real IVT speed ratio RIi is greater than the predetermined value Kerr. If the step motor target operation speed VStp is larger than the operation speed limit Vmax of the step motor 36 at this time, engaging of the power recirculation clutch 9 and disengaging of the direct clutch 10 begin.

As a result, the IVT speed ratio Ii varies from the point A to the point B' without passing through the point D'. Therefore, the IVT speed ratio Ii continues to follow the target value of the IVT speed ratio during the speed change control without any reversal of direction, and a rapid speed change is achieved without giving an uncomfortable feeling to the driver.

Further, when the IVT speed ratio Ii shifts up from the point B to the point D' in FIG. 8, the control unit 80 first increases the CVT speed ratio Ic from Icb to Icb' by outputting a signal corresponding to the target CVT speed ratio TIc to the step motor 36. At the point C in this process, the difference IVTerr of the target IVT speed ratio TIiO and real IVT speed ratio RIi is greater than the predetermined value Kerr. If the step motor target operation speed VStp is larger than the operation speed limit Vmax of the step motor 36 at this time, disengaging of the power recirculation clutch 9 and engaging of the direct clutch 10 begin.

As a result, the IVT speed ratio Ii varies from the point C to the point B' without passing through the point D'. Therefore, the IVT speed ratio Ii continues to follow the target IVT speed ratio TIiO during the speed change operation without any reversal of direction, and a rapid speed change is achieved without giving an uncomfortable feeling to the driver.

According to this embodiment, the conditions for starting clutch change-over in parallel with the CVT speed change control are that the difference IVTerr between the target IVT speed ratio TIiO and real IVT speed ratio RIi is larger than the predetermined value Kerr, and that the target operation speed VStp is larger than the operation speed limit Vmax of the step motor 36.

The meaning of these condition settings will be described referring to FIGS. 14A–14C.

Figures 14A, 14B, 14C:
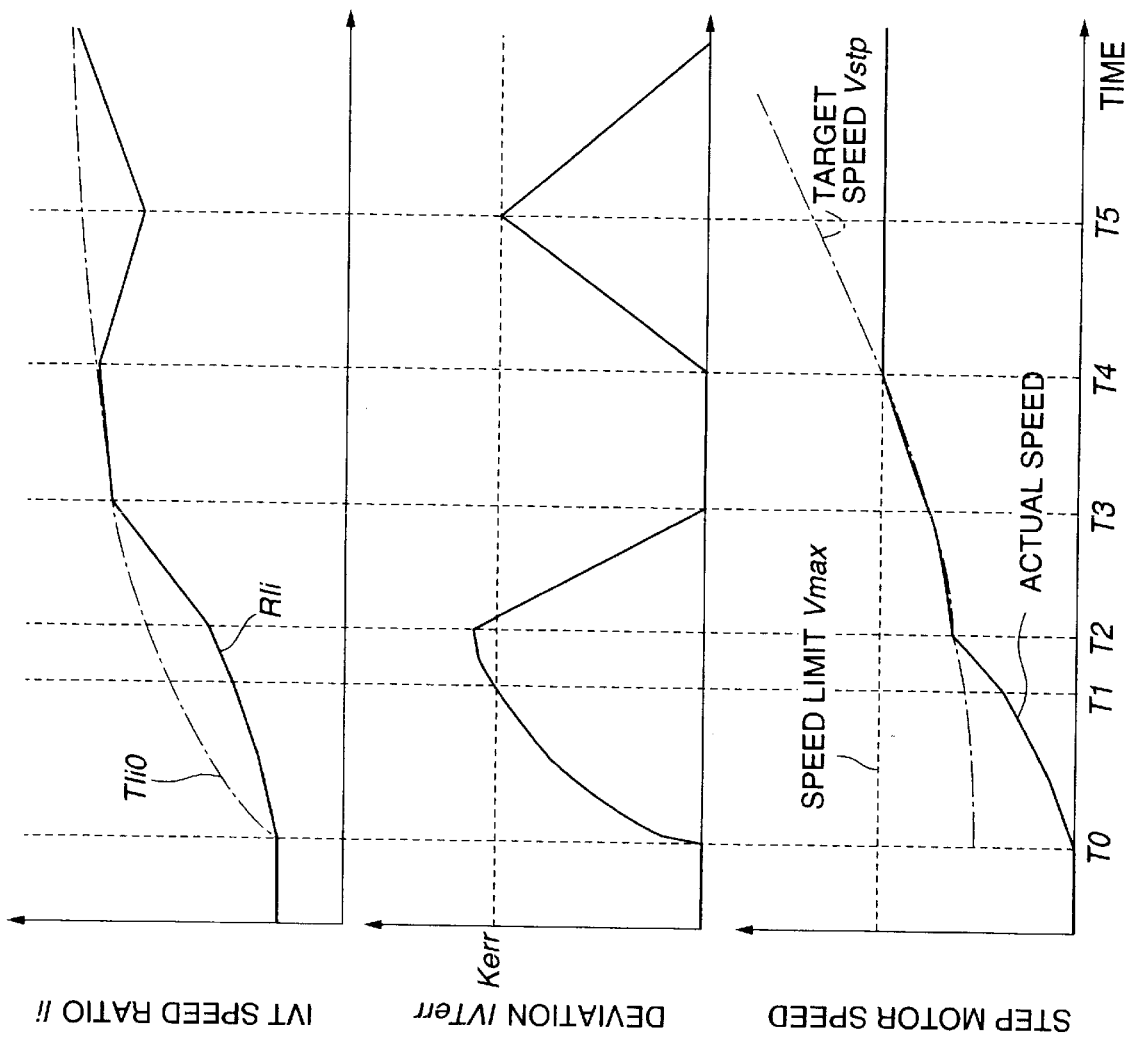
FIGS. 14A–14C are timing charts showing the IVT speed ratio Ii, a deviation IVTerr and the variation of the step motor speed according to the second embodiment of this invention.

Assume that an IVT shift-down is started at the time T0, as shown in FIG. 14A. Due to the initial response delay of the step motor 36, the step motor 36 reaches the target operation speed VStp at the time T2 as shown in FIG. 14C. As a result, the difference IVTerr exceeds the predetermined value Kerr at a time T1, as shown in FIG. 14B. However, the operation speed of the step motor 36 at this time is less than the operation speed limit Vmax as shown in FIG. 14C, so the difference IVTerr from the time T2 to T3 is canceled due to the increase of the target operation speed VStp.

Subsequently, when the target operation speed VStp exceeds the operation speed limit Vmax of the step motor 36 at a time T4, the real IVT speed ratio RIi can no longer be made to follow the target IVT speed ratio TIiO by performing the CVT speed ratio control by outputting a signal to the step motor 36 alone, and the difference IVTerr increases. When the difference IVTerr reaches the predetermined value Kerr at a time T5, engaging of the power recirculation clutch 9 and disengaging of the direct clutch 10 begin. Due to this clutch change-over operation the difference IVTerr is eliminated, and a rapid speed change to the final IVT speed ratio TIc is achieved.

Next, the case will be described when the IVT performs a shift-down from the point D to the point B' in FIG. 8.

In this case, the control unit 80 first increases the CVT speed ratio Ic from the point Icb corresponding to the point D to the point Icb' corresponding to the point D' by outputting a signal corresponding to the target CVT speed ratio TIc to the step motor 36.

Figure 15:
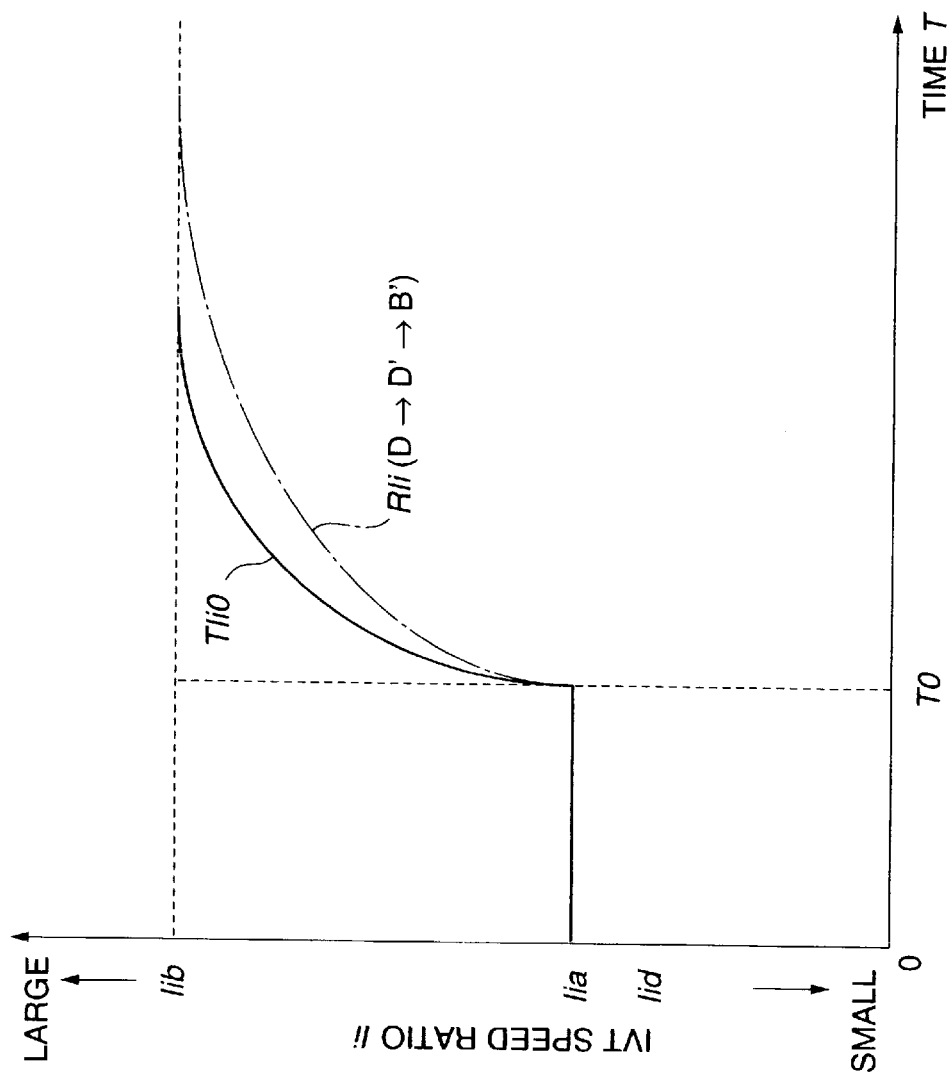
FIG. 15 is a timing chart describing the variation of the IVT speed ratio Ii when the IVT and CVT both perform a shift-down according to the second embodiment of this invention.

However, if the operation speed of the step motor 36 is slower than the variation of the target IVT speed ratio TIiO, the IVT speed ratio RIi shown by a dotted line in the figure will no longer be able to follow the target IVT speed ratio TIiO shown by a solid line in FIG. 15.

Therefore, when the difference IVTerr of the target IVT speed ratio TIiO and real IVT speed ratio RIi exceeds the predetermined value Kerr and the target operation speed VStp is larger than the operation speed limit Vmax of the step motor 36, a clutch change-over operation is started parallel to the CVT speed ratio control.

For example, if the difference IVTerr exceeds the predetermined value Kerr at the point A of FIG. 8, and the target operation speed VStp at this time exceeds the operation speed limit Vmax of the step motor 36, engaging of the power recirculation clutch 9 and disengaging of the direct clutch 10 are started at the point A. As a result, the IVT speed ratio Ii varies from the point A to the point B' without passing through the point D'. In this way, the clutch change-over operation compensates the delay of the CVT speed ratio control, and the ability to follow the target IVT speed ratio TIiO improves.

Hence, it is possible to follow the rapid variation of the target IVT speed ratio TIiO, to follow the rapid speed change due to kickdown, and to improve the drivability of the vehicle.

According to this embodiment, the target IVT speed ratio TIiO and target CVT speed ratio TIc were calculated from the final IVT speed ratio TIi, however it is also possible to find the target CVT speed ratio TIc by calculating a final target CVT speed ratio which corresponds to the final IVT speed ratio TIi, and applying a lowpass filter to the final target CVT speed ratio.

According to this embodiment also, one of the clutch change-over and the control of CVT speed ratio Ic are performed first according to the variation direction of the CVT speed ratio Ic, so the computational load on the control unit 80 is suppressed relatively small.

The contents of Tokugan Hei 11-181842 with a filing date of Jun. 28, 1999 in Japan, and Tokugan 2000-138161 with a filing date of May 11, 2000 in Japan are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

1. A speed change controller for an infinite speed ratio continuously variable transmission for use with a vehicle, the infinite speed ratio continuously variable transmission comprising an input shaft, a continuously variable transmission which transmits a rotation speed of the input shaft to a continuously variable transmission output shaft at an arbitrary speed ratio, a fixed speed ratio transmission which transmits the rotation speed of the input shaft to a fixed speed ratio transmission output shaft at a fixed speed ratio, a planetary gear set comprising a first rotation member joined to the continuously variable transmission output shaft, a second rotation member joined to the fixed speed ratio transmission output shaft, and a third rotation member which varies a rotation direction and a rotation speed according to a difference between a rotation speed of the first rotation member and a rotation speed of the second rotation member, a direct clutch which connects and disconnects the continuously variable transmission output shaft and the third rotation member, and a power recirculation clutch which connects and disconnects the fixed speed ratio transmission output shaft and the second rotation member, the controller comprising:

a sensor which detects a running state of the vehicle;

a sensor which detects a real speed ratio of the infinite speed ratio continuously variable transmission; and a microprocessor programmed to:

set a target speed ratio of the infinite speed ratio continuously variable transmission based on the running state;

determine whether or not the target speed ratio has varied beyond a predetermined speed ratio;

determine which one of control over a combination of the power recirculation clutch and the direct clutch and control over speed ratio will be given priority, depending on both the real speed ratio and the target speed ratio, so that speed ratio control will be implemented continuously in a direction from the real speed ratio toward the target speed ratio; and perform control of the power recirculation clutch and direct clutch, and of the speed ratio of the continuously variable transmission, according to the priority.

2. The speed change controller as defined in claim 1, wherein the microprocessor is further programmed to determine whether or not the control of a higher priority has been completed, and to perform the control of a lower priority after the control of the higher priority has been completed.

3. The speed change controller as defined in claim 1, wherein the microprocessor is further programmed to calculate a difference between the target speed ratio and the real speed ratio, and perform the control of the speed ratio of the continuously variable transmission simultaneously with the control of the power recirculation clutch and direct clutch when the difference is larger than a predetermined difference.

4. The speed change controller as defined in claim 3, wherein the microprocessor is further programmed to engage the power recirculation clutch and disengage the direct clutch when the target speed ratio is larger than a predetermined speed ratio, and disengage the power recirculation clutch and engage the direct clutch when the target speed ratio is smaller than the predetermined speed ratio.

5. The speed change controller as defined in claim 4, wherein the microprocessor is further programmed to calculate a connecting pressure of the power recirculation clutch and a connecting pressure of the direct clutch, prohibit control of the speed ratio of the continuously variable transmission until the connecting pressure of the direct clutch becomes equal to or less than a predetermined pressure when the real speed ratio of the infinite speed ratio continuously variable transmission is varying in an increasing direction toward the target speed ratio, and prohibit control of the speed ratio of the continuously variable transmission until the connecting pressure of the power recirculation clutch becomes equal to or less than a predetermined pressure when the real speed ratio of the infinite speed ratio continuously variable transmission is varying in a decreasing direction toward the target speed ratio.

6. The speed change controller as defined in claim 1, wherein the speed change controller further comprises an actuator which varies the speed ratio of the continuously variable transmission according to an output signal from the microprocessor, and the microprocessor is further programmed to calculate a target operation speed of the actuator based on a variation of the target speed ratio, and perform the control of the speed ratio of the continuously variable transmission simultaneously with the control of the power recirculation clutch and direct clutch when the target drive speed is larger than a predetermined limiting speed.

7. The speed change controller as defined in claim 1, wherein the microprocessor is further programmed to give a higher priority to the control of the power recirculation clutch and direct clutch than to the control of the speed ratio of the continuously variable transmission when the speed ratio of the continuously variable transmission is controlled in a decreasing direction, and give a higher priority to the control of the speed ratio of the continuously variable transmission than to the control of the power recirculation clutch and direct clutch when the speed ratio of the continuously variable transmission is controlled in an increasing direction.

8. The speed change controller as defined in claim 1, wherein the running state detection sensor comprises a sensor which detects a running speed of the vehicle, and a sensor which detects a depression amount of an accelerator pedal with which the vehicle is provided.

9. A speed change controller for an infinite speed ratio continuously variable transmission for use with a vehicle, the infinite speed ratio continuously variable transmission comprising an input shaft, a continuously variable transmission which transmits a rotation speed of the input shaft to a continuously variable transmission output shaft at an arbitrary speed ratio, a fixed speed ratio transmission which transmits the rotation speed of the input shaft to a fixed speed ratio transmission output shaft at a fixed speed ratio, a planetary gear set comprising a first rotation member joined to the continuously variable transmission output shaft, a second rotation member joined to the fixed speed ratio transmission output shaft, and a third rotation member which varies a rotation direction and a rotation speed according to a difference between a rotation speed of the first rotation member and a rotation speed of the second rotation member, a direct clutch which connects and disconnects the continuously variable transmission output shaft and the third rotation member, and a power recirculation clutch which connects and disconnects the fixed speed ratio transmission output shaft and the second rotation member, the controller comprising:

means for detecting a running state of the vehicle;

means for detecting a real speed ratio of the infinite speed ratio continuously variable transmission;

means for setting a target speed ratio of the infinite speed ratio continuously variable transmission based on the running state;

means for determining whether or not the target speed ratio has varied beyond a predetermined speed ratio;

means for determining a priority of controlling the power recirculation clutch and direct clutch, and controlling the speed ratio of the continuously variable transmission, so that, when the target speed ratio has varied beyond the predetermined speed ratio, the real speed ratio of the infinite speed ratio continuously variable transmission varies in the same direction until the real speed ratio reaches the target speed ratio; and means for performing control of the power recirculation clutch and direct clutch, and of the speed ratio of the continuously variable transmission, according to the priority.

10. A speed change control method for an infinite speed ratio continuously variable transmission for use with a vehicle, the infinite speed ratio continuously variable transmission comprising an input shaft, a continuously variable transmission which transmits a rotation speed of the input shaft to a continuously variable transmission output shaft at an arbitrary speed ratio, a fixed speed ratio transmission which transmits the rotation speed of the input shaft to a fixed speed ratio transmission output shaft at a fixed speed ratio, a planetary gear set comprising a first rotation member joined to the continuously variable transmission output shaft, a second rotation member joined to the fixed speed ratio transmission output shaft, and a third rotation member which varies a rotation direction and a rotation speed according to a difference between a rotation speed of the first rotation member and a rotation speed of the second rotation member, a direct clutch which connects and disconnects the continuously variable transmission output shaft and the third rotation member, and a power recirculation clutch which connects and disconnects the fixed speed ratio transmission output shaft and the second rotation member, the method comprising:

detecting a running state of the vehicle;

detecting a real speed ratio of the infinite speed ratio continuously variable transmission;

setting a target speed ratio of the infinite speed ratio continuously variable transmission based on the running state;

determining whether or not the target speed ratio has varied beyond a predetermined speed ratio;

determining a priority of controlling the power recirculation clutch and direct clutch, and controlling the speed ratio of the continuously variable transmission, so that, when the target speed ratio has varied beyond the predetermined speed ratio, the real speed ratio of the infinite speed ratio continuously variable transmission varies in the same direction until the real speed ratio reaches the target speed ratio; and performing control of the power recirculation clutch and direct clutch, and of the speed ratio of the continuously variable transmission, according to the priority.

11. A speed change controller for an infinite speed ratio continuously variable transmission for use with a vehicle, the infinite speed ratio continuously variable transmission comprising an input shaft, a continuously variable transmission which transmits a rotation speed of the input shaft to a continuously variable transmission output shaft at an arbitrary speed ratio, a fixed speed ratio transmission which transmits the rotation speed of the input shaft to a fixed speed ratio transmission output shaft at a fixed speed ratio, a planetary gear set comprising a first rotation member joined to the continuously variable transmission output shaft, a second rotation member joined to the fixed speed ratio transmission output shaft, and a third rotation member which varies a rotation direction and a rotation speed according to a difference between a rotation speed of the first rotation member and a rotation speed of the second rotation member, a direct clutch which connects and disconnects the continuously variable transmission output shaft and the third rotation member, and a power recirculation clutch which connects and disconnects the fixed speed ratio transmission output shaft and the second rotation member, the controller comprising:

a sensor which detects a running state of the vehicle;

a sensor which detects a real speed ratio of the infinite speed ratio continuously variable transmission; and a microprocessor programmed to:

set a target speed ratio of the infinite speed ratio continuously variable transmission based on the running state;

determine if a mode change-over between a power recirculation mode wherein the power recirculation clutch is engaged while the direct clutch is disengaged, and a direct mode wherein the direct clutch is engaged while the power recirculation clutch is disengaged, is required to achieve the target speed ratio;

determine which one of control over a combination of the power recirculation clutch and the direct clutch and control over speed ratio will be given priority, depending on both the real speed ratio and the target speed ratio, so that speed ratio control will be implemented continuously in a direction from the real speed ratio toward the target speed ratio; and perform control of the power recirculation clutch and direct clutch, and of the speed ratio of the continuously variable transmission, according to the determined priority.

* * * * *